(12) United States Patent
Uekusa et al.

(10) Patent No.: US 11,155,063 B2
(45) Date of Patent: Oct. 26, 2021

(54) STRETCHABLE STRUCTURE, MULTILAYERED STRETCHABLE SHEET, SPUN YARN, AND FIBER STRUCTURE

(71) Applicant: MITSUI CHEMICALS, INC., Tokyo (JP)

(72) Inventors: Takayuki Uekusa, Ichihara (JP); Yoshisada Tamo, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 239 days.

(21) Appl. No.: 16/079,064

(22) PCT Filed: Mar. 24, 2017

(86) PCT No.: PCT/JP2017/011999
§ 371 (c)(1),
(2) Date: Aug. 22, 2018

(87) PCT Pub. No.: WO2017/164364
PCT Pub. Date: Sep. 28, 2017

(65) Prior Publication Data
US 2019/0054719 A1   Feb. 21, 2019

(30) Foreign Application Priority Data

Mar. 25, 2016  (JP) .................. JP2016-061632

(51) Int. Cl.
| | | |
|---|---|---|
| *B32B 25/08* | (2006.01) | |
| *C08F 210/14* | (2006.01) | |
| *C08L 23/20* | (2006.01) | |
| *D01F 8/06* | (2006.01) | |
| *B32B 27/32* | (2006.01) | |
| *B32B 27/08* | (2006.01) | |

(52) U.S. Cl.
CPC ............ *B32B 25/08* (2013.01); *B32B 27/08* (2013.01); *B32B 27/32* (2013.01); *C08F 210/14* (2013.01); *C08L 23/20* (2013.01); *D01F 8/06* (2013.01); *B32B 2250/24* (2013.01); *B32B 2307/54* (2013.01)

(58) Field of Classification Search
CPC ..................................................... B32B 25/08
See application file for complete search history.

(56) References Cited

U.S. PATENT DOCUMENTS

| | | | |
|---|---|---|---|
| 4,892,851 A | 1/1990 | Ewen et al. | |
| 5,036,034 A | 7/1991 | Ewen | |
| 6,589,892 B1* | 7/2003 | Smith ............... | D01F 8/06 442/361 |
| 10,714,750 B2 | 7/2020 | Tabata et al. | |
| 2003/0055179 A1 | 3/2003 | Ota et al. | |
| 2005/0228155 A1 | 10/2005 | Kawai et al. | |
| 2007/0172683 A1 | 7/2007 | Ito et al. | |
| 2010/0069507 A1 | 3/2010 | Tabata et al. | |
| 2012/0094173 A1 | 4/2012 | Moruiguchi et al. | |
| 2012/0220728 A1 | 8/2012 | Uekusa et al. | |
| 2013/0295464 A1 | 11/2013 | Yanagi et al. | |
| 2015/0239996 A1 | 8/2015 | Funaya et al. | |
| 2017/0141396 A1 | 5/2017 | Tabata et al. | |
| 2017/0320304 A1* | 11/2017 | Takeda ............... | A61F 13/49015 |
| 2018/0062161 A1 | 3/2018 | Yanagi et al. | |
| 2020/0303738 A1 | 9/2020 | Tabata et al. | |
| 2020/0313187 A1 | 10/2020 | Tabata et al. | |

FOREIGN PATENT DOCUMENTS

| | | |
|---|---|---|
| JP | S61-134250 A | 6/1986 |
| JP | S62-53672 A | 3/1987 |
| JP | S62-257838 A | 11/1987 |
| JP | H02-41303 A | 2/1990 |
| JP | H03-193796 A | 8/1991 |
| JP | H05-50522 A | 3/1993 |
| JP | H11-222724 A | 8/1999 |
| JP | H11-240116 A | 9/1999 |
| JP | H11-323659 A | 11/1999 |
| JP | 2002-019029 A | 1/2002 |
| JP | 2003-175558 A | 6/2003 |
| JP | 2004-050621 | 2/2004 |
| JP | 2004-323983 A | 11/2004 |
| JP | 2008-088293 A | 4/2008 |
| JP | 2008-248137 A | 10/2008 |
| JP | 2014-167185 A | 9/2014 |
| JP | 2015-052128 A | 3/2015 |
| JP | 2015-063079 A | 4/2015 |
| JP | 2015-063633 A | 4/2015 |
| JP | 2015-086367 A | 5/2015 |

(Continued)

OTHER PUBLICATIONS

International Search Report with English language translation and Written Opinion issued in International Application No. PCT/JP2017/011999 dated Apr. 18, 2017.

(Continued)

*Primary Examiner* — Andrew T Piziali
(74) *Attorney, Agent, or Firm* — Foley & Lardner LLP

(57) ABSTRACT

An object of the present invention is to provide a stretchable structure that has stretchability together with high stress relaxation properties, and provides fit feeling with less tightening by recovering slowly after stretching. The object is achieved by a stretchable structure having the following characteristics: a tensile permanent set ($PS_{10M}$) of 1% or more and 50% or less, wherein the tensile permanent set ($PS_{10M}$) is a value obtained 10 minutes after 150% elongation at a tension rate of 200 mm/minute in accordance with JIS K7127, and a ratio $PS_{1M}/PS_{10M}$ of 1.10 or more, wherein the $PS_{10M}$ is the tensile permanent set obtained 10 minutes after the elongation and the $PS_{1M}$ is the tensile permanent set obtained 1 minute after the elongation.

12 Claims, No Drawings

(56) References Cited

FOREIGN PATENT DOCUMENTS

| | | |
|---|---|---|
| JP | 2015-093918 A | 5/2015 |
| KR | 10-2002-0032558 | 5/2002 |
| KR | 2010-0014074 A | 2/2010 |
| KR | 2012-0111934 A | 10/2012 |
| WO | WO-01/27124 A1 | 4/2001 |
| WO | WO-01/53369 A1 | 7/2001 |
| WO | WO-2005/053951 A1 | 6/2005 |
| WO | WO-2011/055803 A1 | 5/2011 |
| WO | WO-2012/102037 A1 | 8/2012 |
| WO | WO-2014/050817 A1 | 4/2014 |
| WO | WO-2014/208564 A1 | 12/2014 |

OTHER PUBLICATIONS

Korean Patent Office, "Industrial Property Tribunal 63 part Sentence," Korean Patent Trial No. 2020-2180, dated Jun. 18, 2021.

\* cited by examiner

STRETCHABLE STRUCTURE, MULTILAYERED STRETCHABLE SHEET, SPUN YARN, AND FIBER STRUCTURE

RELATED APPLICATIONS

The present application claims priority under 37 U.S.C. § 371 to International Patent Application No. PCT/JP2017/011999, filed Mar. 24, 2017, which claims priority to and the benefit of Japanese Patent Application No. 2016-061632, filed on Mar. 25, 2016. The contents of these applications are hereby incorporated by reference in their entireties.

TECHNICAL FIELD

The present invention relates to a stretchable structure, a multilayered stretchable sheet, a spun yarn, and a fiber structure.

BACKGROUND ART

There is a demand for materials having moisture permeability, flexibility, and stretchability mainly as medical materials, sanitary materials, and the like. In the field of fibers, such as films and filaments, a polyurethane-based resin can be mentioned as a representative material satisfying these requirements. However, the polyurethane-based resin is expensive and sometimes imposes a burden on the environment. In addition, the polyurethane-based resin bears a problem of strong tightening due to quick return after stretching which may lead to the occurrence of congestion or the like upon long time use.

Various methods for solving such problems have been disclosed. For example, PTLs 1 and 2 each discloses a porous film obtained by stretching a sheet which is a blend of a thermoplastic elastomer other than a polyurethane-based elastomer and an inorganic filler. In addition, PTLs 3 and 4 each discloses a stretchable sheet made of a thermoplastic elastomer, a hydrophilic resin, and porous particles. Further, PTL 5 discloses a sheet and a film made of a 4-methyl-1-pentene/α-olefin copolymer having excellent stress relaxation properties.

Meanwhile, in recent years, regarding the flexible fibers used especially in fields of sports, clothing, or sanitary material, there is a strong demand for not only high stretchability, but also high functionality represented by thinness, light weight, and transparency. In these fields, elastic fibers made of polyamide, polyester or polyurethane have been widely used (for example, PTLs 5 to 8). Although filaments obtained using a polyolefin-based resin as a raw material have an advantage of being lighter in weight and lower in water absorption as compared to those obtained using the above-mentioned resin, flexibility has been a problem. Further, a monofilament obtained by spinning a resin material containing an ethylene-based copolymer satisfying specific requirements, followed by further stretching (PTL 9), and a spun yarn obtained by spinning a 4-methyl-1-pentene copolymer (PTL 10) have been disclosed.

CITATION LIST

Patent Literature

PTL 1
Japanese Patent Application Laid-Open No. 5-50522
PTL 2
Japanese Patent Application Laid-Open No. 2008-88293
PTL 3
Japanese Patent Application Laid-Open No. 2015-63633
PTL 4
Japanese Patent Application Laid-Open No. 2015-86367
PTL 5
Pamphlet of International Publication No. 2014/208564
PTL 6
Japanese Patent Application Laid-Open No. 11-323659
PTL 7
Japanese Patent Application Laid-Open No. 11-222724
PTL 8
Japanese Patent Application Laid-Open No. 2008-248137
PTL 9
Japanese Patent Application Laid-Open No. 2004-323983
PTL 10
Japanese Patent Application Laid-Open No. 2014-167185

SUMMARY OF INVENTION

Technical Problem

Regarding the foregoing PTLs 1 and 2, maintaining high level of each of stretchability and flexibility was insufficient. Further, the sheets of foregoing PTLs 3 and 4 bear problems such as too quick return due to high stretchability, and low stress relaxation. In PTL 5, high stress relaxation properties were achieved but stretching and contracting were difficult and, therefore, further improvements are necessary for achieving both stretchability and stress relaxation properties.

On the other hand, when the fibers disclosed in PTLs 6 to 8 were processed into a clothing or the like, tightening was strong due to stretchability and wearing comfort was poor.

The fibers disclosed in PTLs 9 and 10 bear problems of low stretchability due to low flexibility and elongation and furthermore, difficulty in alleviating stress. Therefore there is still room for improvement.

An object of the present invention is to provide a polyolefin-based filament which solves the above-mentioned problems of the related art, which is a stretchable structure made of an olefin-based resin and which is excellent in stretchability and also has a well-balanced stress relaxation properties.

The present invention has been made in view of the background of the related art and aims at providing a stretchable structure, and a multilayered stretchable sheet, a spun yarn, and a fiber structure which uses the same. The stretchable structure has high stress relaxation properties together with stretchability, provides fit feeling with less tightening by recovering slowly after stretching, and changes the stretchability and the material hardness depending on speed.

Solution to Problem

[1] A stretchable structure having following characteristics:

a tensile permanent set ($PS_{10M}$) of 1% or more and 50% or less, wherein the tensile permanent set ($PS_{10M}$) is a value obtained 10 minutes after 150% elongation at a tension rate of 200 mm/minute in accordance with JIS K7127, and a ratio $PS_{1M}/PS_{10M}$ of 1.10 or more, wherein the $PS_{10M}$ is the tensile permanent set obtained 10 minutes after the elongation and the $PS_{1M}$ is tensile permanent set obtained 1 minute after the elongation.

[2] The stretchable structure according to [1], in which a surface layer (Z) including a thermoplastic elastomer (C) is laminated on a surface of a core layer (Y) including a resin composition (X) which contains a 4-methyl-1-pentene/α-olefin copolymer (A) satisfying the following requirement (a):

Requirement (a): the copolymer (A) contains 50 to 90 mol % of a structural unit (i) derived from 4-methyl-1-pentene and 10 to 50 mol % of a structural unit (ii) derived from an α-olefin exclusive of 4-methyl-1-pentene, a total of the structural unit (i) and the structural unit (ii) being 100 mol %.

[3] The stretchable structure according to [2], in which the thermoplastic elastomer (C) is at least one member selected from a polyolefin-based elastomer (B-1), a polystyrene-based elastomer (B-2), and a polyamide-based elastomer (B-4).

[4] The stretchable structure according to [3], in which the polyolefin-based elastomer (B-1) is a dynamically cross-linked product having a gel content of 0% by weight or more and 90% by weight or less.

[5] The stretchable structure according to [3] or [4], in which the polyolefin-based elastomer (B-1) is a dynamically crosslinked product having a gel content of 20% by weight or more and 90% by weight or less.

[6] The stretchable structure according to any one of [3] to [5], in which the polyolefin-based elastomer (B-1) is a dynamically crosslinked product of a crystalline polyolefin resin (C-1) and an olefin-based rubber (C-2).

[7] The stretchable structure according to any one of [2] to [6], in which the 4-methyl-1-pentene/α-olefin copolymer (A) is a copolymer of a structural unit (i) derived from 4-methyl-1-pentene and a structural unit (ii) derived from propylene.

[8] The stretchable structure according to any one of [1] to [7], which has a multilayered sheet structure.

[9] A multilayered stretchable sheet including at least one layer of the stretchable structure according to [8].

[10] The stretchable structure according to any one of [1] to [7], which has a multilayered filament structure.

[11] The stretchable structure according to [10], wherein the difference between 3% stretch modulus value and 50% stretch modulus value, both measured in accordance with JIS L1013, is 50% or less.

[12] A spun yarn including the stretchable structure having a multilayered filament structure according to [10] or [11].

[13] A fiber structure including the spun yarn according to [12].

Advantageous Effects of Invention

According to the present invention, there is provided a stretchable structure which has high stress relaxation properties together with stretchability, and which provides a fit feeling with less tightening by recovering slowly after stretching. There are also provided a multilayered stretchable sheet, a spun yarn, and a fiber structure which use the above-mentioned stretchable structure.

DESCRIPTION OF EMBODIMENTS

Hereinafter, the stretchable structure of the present invention will be described.

The stretchable structure of the present invention has a tensile permanent set ($PS_{10M}$) of 1% or more and 50% or less, preferably 2% or more and 45% or less, and more preferably 5% or more and 40% or less, in which the tensile permanent set ($PS_{10M}$) is a value obtained 10 minutes after 150% elongation at a tension rate of 200 mm/minute in accordance with JIS K7127. The stretchable structure of the present invention has a ratio $PS_{1M}/PS_{10M}$ of 1.10 or more, preferably 1.13 or more and 30.0 or less, and more preferably 1.15 or more and 20.0 or less, in which the $PS_{10M}$ is the tensile permanent set obtained 10 minutes after the elongation and $PS_{1M}$ is the tensile permanent set obtained 1 minute after the elongation. The stretchable structure of the present invention satisfying such characteristics has a property that the stretched structure does not contract immediately and contract with time. By virtue of such a property, for example, when the stretchable structure of the present invention is used for a sheet or a spun yarn and then processed into a clothing, tightening caused by stretchability is greatly reduced and thus the problem of poor wearing comfort is resolved.

Preferably, the stretchable structure of the present invention is a stretchable structure in which a surface layer (Z) formed of a thermoplastic elastomer (C) is laminated on a surface of a core layer (Y) including a resin composition (X). The resin composition (X) contains a 4-methyl-1-pentene/α-olefin copolymer (A) satisfying the following requirement (a):

Requirement (a): the copolymer (A) consists of 50 to 90 mol % of a structural unit (i) derived from 4-methyl-1-pentene and 10 to 50 mol % of a structural unit (ii) derived from an α-olefin exclusive of 4-methyl-1-pentene, a total of the structural unit (i) and the structural unit (ii) being 100 mol %.

The stretchable structure preferably has a thickness of 20 μm or more and 500 μm or less, more preferably 20 μm or more and 350 μm or less, and still more preferably 50 μm or more and 300 μm or less. The stretchable structure having such a thickness is easily stretchable and exhibits excellent handleability.

The ratio of thicknesses between the base material layer and the surface layer in the stretchable structure [thickness of the base material layer/thickness of the surface layer] is not particularly limited, but it is preferably 1/100 to 100/1 and more preferably 1/50 to 50/1.

The stretchable structure may be, for example, a multilayered sheet or a multilayered filament.

The phrase "the surface layer (Z) is laminated on the surface of the core layer (Y)" means that at least a part of the surface layer (Z) is in contact with at least a part of the core layer (Y). The contact ratio between the base material layer (Z) and the core layer (Y) is preferably 30% or more and 100% or less, and more preferably 50% or more and 100% or less, relative to the total surface area of the base material layer (Z).

The stretchable structure satisfying such characteristics has a property of not contracting immediately after stretching, but contract with time. By virtue of such a property, for example, when the stretchable structure of the present invention is used for a spun yarn and then processed into a clothing, tightening caused by stretchability is greatly reduced and thus the problem of poor wearing comfort is resolved.

1. Core Layer (Y)

1-1. Resin Composition (X)

The core layer (Y) includes a resin composition (X) containing a 4-methyl-1-pentene/α-olefin copolymer (A) satisfying the requirement (a) below.

[4-methyl-1-pentene/α-olefin copolymer (A)]

In addition to the below mentioned requirement (a), the 4-methyl-1-pentene/α-olefin copolymer (A) preferably satisfies any one or a plurality of the following requirements (b), (c), (d), and (e). Further, in addition to the requirement (a) or the requirements (a) to (e), the 4-methyl-1-pentene/α-olefin copolymer (A) preferably satisfies 1 or more and 5 or less requirements, more preferably 2 or more and 5 or less requirements, still more preferably 3 or more and 5 or less requirements, even more preferably 4 or more and 5 or less requirements, and particularly preferably all requirements selected from the requirements (f), (g), (h), (i), and (j).

Requirement (a):

The copolymer (A) consists of 50 to 90 mol % of a structural unit (i) derived from 4-methyl-1-pentene and 10 to 50 mol % of a structural unit (ii) derived from an α-olefin exclusive of 4-methyl-1-pentene, a total of the structural unit (i) and the structural unit (ii) being 100 mol %.

That is, the lower limit value of the proportion of the structural unit (i) is 50 mol %, but it is preferably 60 mol %, more preferably 65 mol %, and still more preferably 68 mol %. On the other hand, the upper limit value of the proportion of the structural unit (i) is 90 mol %, but it is preferably 87 mol %, more preferably 86 mol %, and particularly preferably 80 mol % or less. Since the proportion of the structural unit (i) in the copolymer (A) is equal to or higher than the lower limit value, the copolymer (A) has a peak value temperature of tanδ around room temperature. Such a copolymer (A) exhibits excellent shape followability and stress relaxation properties. In addition, the copolymer (A) has a moderate flexibility and exhibits hardness change dependent on a deformation rate when the proportion of the structural unit (i) is the upper limit value or less.

The upper limit value of the proportion of the structural unit (ii) is 85 mol %, but it is preferably 40 mol %, more preferably 35 mol %, and still more preferably 32 mol %. On the other hand, the lower limit value of the proportion of the structural unit (ii) is 10 mol %, but it is more preferably 13 mol %, still more preferably 14 mol %, and particularly preferably 20 mol %.

Examples of the α-olefin leading to the structural unit (ii) include linear α-olefins having 2 to 20 carbon atoms, preferably 2 to 15 carbon atoms, more preferably 2 to 10 carbon atoms, such as ethylene, propylene, 1-butene, 1-pentene, 1-hexene, 1-octene, 1-decene, 1-undecene, 1-dodecene, 1-tetradecene, 1-hexadecene, 1-octadecene, and 1-eicosene; and branched α-olefins having 5 to 20 carbon atoms, preferably 5 to 15 carbon atoms, such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene. Among these compounds, ethylene, propylene, 1-butene, 1-pentene, 1-hexene, and 1-octene are preferable, ethylene and propylene are more preferable, and propylene is still more preferable.

Herein, according to one aspect of the present invention, the copolymer (A) usually consists only of the structural unit (i) and the structural unit (ii). However, in addition to the structural unit (i) and the structural unit (ii), the copolymer (A) may further contain a structural unit (iii) in a small amount (for example, 10 mol % or less) which does not impair the object of the present invention. The structural unit (iii) may be derived from other monomers exclusive of 4-methyl-1-pentene and an α-olefin which the structural unit (ii) is derived therefrom. When the copolymer (A) is a 4-methyl-1-pentene/propylene copolymer, preferred specific examples of such other monomers include 5-vinyl-2-norbornene and 5-ethylidene-2-norbornene.

Requirement (b):

No melting point (Tm) for the copolymer (A) is observed in a measurement by a differential scanning calorimeter (DSC). When the melting point (Tm) is not observed for the copolymer (A), the chronological change in tensile permanent set of the stretchable structure can be made moderate by improving the tensile properties of the stretchable structure.

Requirement (c):

The intrinsic viscosity [η] of the copolymer (A), as measured in decalin at 135° C., is preferably 0.1 dL/g or more and 5.0 dL/g or less, more preferably 0.5 dL/g or more and 4.0 dL/g or less, and still more preferably 0.5 dL/g or more and 3.5 dL/g or less.

The molecular weight of the copolymer (A) can be controlled by using hydrogen during polymerization, and the intrinsic viscosity [η] of the copolymer (A) can be adjusted by freely producing low molecular weight materials to high molecular weight materials. When the intrinsic viscosity [η] of the copolymer (A) is 0.1 dL/g or more and 5.0 dL/g or less, it becomes possible to improve the molding processability at the time of processing of a polymer composition used as a material of the stretchable structure.

Requirement (d):

The density of the copolymer (A) (measured in accordance with ASTM D1505) is preferably 830 kg/m$^3$ or more and 870 kg/m$^3$ or less, more preferably 830 kg/m$^3$ or more and 865 kg/m$^3$ or less, and still more preferably 830 kg/m$^3$ or more and 855 kg/m$^3$ or less. The details of the measurement conditions and the like are as described in the section EXAMPLES described hereinbelow.

The density of the copolymer (A) can be changed appropriately by changing the composition ratio of the comonomers. When the density of the copolymer (A) is within the above-specified range, the stretchable structure can be made lighter.

Requirement (e):

In the copolymer (A), a ratio of the weight-average molecular weight (Mw) to the number-average molecular weight (Mn) (molecular weight distribution: Mw/Mn) as measured by gel permeation chromatography (GPC) is preferably 1.0 or more and 3.5 or less, more preferably 1.2 or more and 3.0 or less, and still more preferably 1.5 or more and 2.8 or less. The details of the measurement conditions and the like are as described in the section EXAMPLES described hereinbelow. In particular, when the Mw/Mn of the copolymer (A) is 3.5 or less, it becomes possible to improve the molding processability at the time of processing of a polymer composition which serves as a material for the stretchable structure by reducing the influence of low molecular weight, low stereoregular polymers related to the composition distribution.

The copolymer (A) satisfying the requirement (e) within the range of the intrinsic viscosity [η] defined by the requirement (c) can be obtained by using a catalyst described hereinbelow. The foregoing Mw/Mn values and the following Mw values are values measured by the method used in Examples described hereinbelow.

In addition, the weight-average molecular weight (Mw) of the copolymer (A) in terms of polystyrene, as measured by gel permeation chromatography (GPC), is preferably 500 or more and 10,000,000 or less, more preferably 1,000 or more and 5,000,000 or less, and still more preferably 1,000 or more and 2,500,000 or less.

Requirement (f):

The copolymer (A) has a tan δ peak value of preferably 1.0 or more and 5.0 or less, more preferably 1.5 or more and 5.0 or less, and still more preferably 2.0 or more and 4.0 or less, as obtained by a dynamic viscoelasticity measurement at a frequency of 10 rad/s (1.6 Hz) in a temperature range of −40° C. to 150° C. When the tan δ peak value of the copolymer (A) is 1.0 or more, excessive deformation does not occur upon application of stress, and the irregularity followability of the stretchable structure can be enhanced. Further, when the tanδ peak value of the copolymer (A) is 1.0 or more, the user of the stretchable structure is less likely to feel uncomfortable due to high stress absorptivity.

Requirement (g):

The copolymer (A) has a tan δ peak temperature of preferably 0° C. or higher and 40° C. or lower, more preferably 10° C. or higher and 40° C. or lower, still more preferably 20° C. or higher and 40° C. or lower, and even more preferably 25° C. or higher and 40° C. or lower, as obtained by a dynamic viscoelasticity measurement at a frequency of 10 rad/s (1.6 Hz) in a temperature range of −40° C. to 150° C.

When the tanδ peak temperature of the copolymer (A) falls within the above-specified temperature range, the tan δ value of the stretchable structure at room temperature can be increased further and the stress absorptivity of the stretchable structure at room temperature can be increased further. Further, when the tan δ peak temperature of the copolymer (A) falls within the above-specified temperature range (around room temperature), the vibration absorptivity of the stretchable structure, and the hardness and followability of the material can be changed according to the tensile rate or deformation rate.

Requirement (h):

The copolymer (A) has a Shore A hardness of preferably 5 or more and 95 or less, more preferably 10 or more and 95 or less, still more preferably 25 or more and 90 or less, and particularly preferably 50 or more and 90 or less, in which the shore A hardness is measured in accordance with JIS K6253 using the copolymer (A) in the form of a press sheet having a thickness of 3 mm and after 15 seconds from the start of indenter contact. When the copolymer (A) has a Shore A hardness of 5 or more and 95 or less, the flexibility of the stretchable structure can be enhanced further.

Requirement (i):

The copolymer (A) has a variation ΔHS of preferably 10 or more and 60 or less, more preferably 10 or more and 50 or less, and still more preferably 15 or more and 45 or less. The ΔHS is a variation between the value of Shore A hardness immediately after the start of indenter contact and the value of Shore A hardness after 15 seconds from the start of indenter contact, in which the shore A hardness is measured in accordance with JIS K6253 using the copolymer (A) in the form of a press sheet having a thickness of 3 mm. When the ΔHS of the copolymer (A) is 10 or more and 60 or less, the stress relaxation properties and shape followability of the stretchable structure can be enhanced further.

The above-mentioned ΔHS is a value obtained according to the following equation.

$$\Delta HS = (\text{Shore } A \text{ hardness value immediately after start of indenter contact} - \text{Shore } A \text{ hardness value 15 seconds after start of indenter contact})$$

[Method for Producing 4-methyl-1-pentene/α-olefin Copolymer (A)]

The method for producing the copolymer (A) is not particularly limited. For example, the copolymer (A) can be obtained by polymerizing 4-methyl-1-pentene and the α-olefin exclusive of 4-methyl-1-pentene in the presence of a suitable polymerization catalyst.

Catalysts known in the related art, for example magnesium-supported titanium catalysts, and metallocene catalysts described in Pamphlet of International Publication No. WO 01/53369, Pamphlet of International Publication No. WO 01/27124, Japanese Patent Application Laid-Open No. 3-193796, Japanese Patent Application Laid-Open No. 02-41303, Pamphlet of International Publication No. WO 2011/055803, Pamphlet of International Publication No. WO 2014/050817, and the like can be suitably used as the polymerization catalyst.

[Thermoplastic Elastomer (B)]

The resin composition (X) may contain a thermoplastic elastomer (B) other than the 4-methyl-1-pentene/α-olefin copolymer (A) as long as the properties of the copolymer (A) is not impaired.

When the total amount of the 4-methyl-1-pentene/α-olefin copolymer (A) and the thermoplastic elastomer (B) is 100 parts by mass, from the viewpoint of further improvement in flexibility and stress relaxation properties, the upper limit value for the content of the copolymer (A) in the resin composition (X) is preferably 100 parts by mass, more preferably 90 parts by mass, still more preferably 75 parts by mass, and particularly preferably 60 parts by mass. The lower limit value for the content of the copolymer (A) in the resin composition (X) is preferably 10 parts by mass, more preferably 15 parts by mass, still more preferably 25 parts by mass, and particularly preferably 30 parts by mass.

In other words, when the total amount of the 4-methyl-1-pentene/α-olefin copolymer (A) and the thermoplastic elastomer (B) is 100 parts by mass, the lower limit value for the content of the thermoplastic elastomer (B) in the resin composition (X) is preferably 0 parts by mass, more preferably 10 parts by mass, still more preferably 25 parts by mass, and particularly preferably 40 parts by mass. The upper limit value for the content of the thermoplastic elastomer (B) in the resin composition (X) is preferably 90 parts by mass, more preferably 85 parts by mass, still more preferably 75 parts by mass, and particularly preferably 70 parts by mass.

In the present invention, the thermoplastic elastomer (B) means a polymer which exhibits thermoplastic properties upon heating to a temperature equal to or higher than its melting point, but exhibits rubber elastic properties at ambient temperature. Specific examples of the thermoplastic elastomer (B) include a polyolefin-based elastomer (B-1), a polystyrene-based elastomer (B-2), a polyester-based elastomer (B-3), and a polyamide-based elastomer (B-4).

(Polyolefin-Based Elastomer (B-1))

Specific examples of the polyolefin-based elastomer (B-1) include the following first and second embodiments.

The first embodiment of the polyolefin-based elastomer (B-1) is a copolymer of one monomer selected from the group consisting of ethylene and propylene, and another monomer selected from the group consisting of butadiene, isoprene, isobutylene, and α-olefin. The mode of copolymerization may be either a block copolymerization or a graft copolymerization, and only when the copolymer is a copolymer of an α-olefin and one member selected from the group consisting of polyethylene and polypropylene, the copolymerization mode may be a random copolymerization. The α-olefin is an olefin having a double bond at one end of the molecular chain, and 1-octene or the like is preferably used. A polybutadiene block or polyisoprene block composed of the above-mentioned butadiene or isoprene may be hydrogenated.

An example of the first embodiment may be a block copolymer of a polyolefin block forming a highly crystalline polymer (such as polypropylene) which forms a hard segment, and an amorphous monomer which forms a soft segment. Specific examples of such a first embodiment include an olefin (crystalline)/ethylene/butylene/olefin block copolymer and a polypropylene/polyolefin (amorphous)/polypropylene block copolymer. Examples of commercially available products of such a first embodiment include products sold under the trade name DYNARON (registered trademark) of JSR Corporation, trade names TAFMER (registered trademark) and NOTIO (registered trademark) of Mitsui Chemicals, Inc., trade names ENGAGE (registered trademark) and VERSIFY (registered trademark) of Dow Chemical Co., Ltd., and trade name Vistamaxx (registered trademark) of Exxon Mobil Chemical Co., Ltd.

The second embodiment of the polyolefin-based elastomer (B-1) is a blend of one member selected from the group consisting of polyethylene and polypropylene, and another member selected from the group consisting of an ethylene/propylene copolymer, an ethylene/propylene/diene copolymer, an ethylene/butene copolymer, and hydrogenated styrene/butadiene copolymer. In this embodiment, the ethylene/propylene copolymer, the ethylene/propylene/diene copolymer, and the ethylene/butene copolymer may be partially or completely crosslinked.

Examples of commercially available products of the second embodiment include products sold under the trade name MILASTOMER (registered trademark) of Mitsui Chemicals, Inc., trade name ESOPREX (registered trademark) of Sumitomo Chemical Co., Ltd., trade names THERMORUN (registered trademark) and ZELAS (registered trademark) of Mitsubishi Chemical Corporation, trade name Santoplene (registered trademark) of Exxon Mobil Chemical Co., Ltd., and FX manufactured by Nishida Giken Co., Ltd.

The above-mentioned polyolefin-based elastomers (B-1) may be modified with at least one functional group selected from the group consisting of an acid anhydride group, a carboxyl group, an amino group, an imino group, an alkoxysilyl group, a silanol group, a silyl ether group, a hydroxyl group, and an epoxy group.

(Styrene-Based Elastomer (B-2))

Specific examples of the styrene-based elastomer (B-2) include a block copolymer (SBS) of a polystyrene block which forms a hard segment (crystalline part) and a diene-based monomer block which forms a soft portion, a hydrogenated styrene/butadiene/styrene block copolymer (HSBR), a styrene/ethylene/propylene/styrene block copolymer (SEPS), a styrene/ethylene/butane/styrene block copolymer (SEBS), a styrene/isoprene/styrene block copolymer (SIS), a styrene/isobutylene/styrene copolymer (SIBS), and a styrene/isobutylene copolymer (SIB). The styrene-based elastomers (B-2) may be used alone or in combination of two or more copolymers.

Examples of commercially available products of the hydrogenated styrene/butadiene/styrene block copolymer (HSBR) include a product sold under the trade name DYNARON (registered trademark) of JSR Corporation.

The styrene/ethylene/propylene/styrene block copolymer (SEPS) is obtained by hydrogenating a styrene/isoprene/styrene block copolymer (SIS). Examples of commercially available products of SIS include products sold under the trade name JSR SIS (registered trademark) of JSR Corporation, trade name HYBRAR (registered trademark) of Kuraray Co., Ltd., and trade name KRATON D (registered trademark) of Shell Corporation. Examples of commercially available products of SEPS include trade name SEPTON (registered trademark) of Kuraray Co., Ltd., and trade name KRATON (registered trademark) of Shell Corporation.

Examples of commercially available products of the styrene/ethylene/butane/styrene block copolymer (SEBS) include products sold under the trade name TUFTEC (registered trademark) of Asahi Kasei Corporation and trade name KRATON (registered trademark) of Shell Corporation.

Examples of commercially available products of the styrene/isobutylene/styrene copolymer (SIBS) or the styrene/isobutylene copolymer (SIB) include a product sold under the trade name SIBSTAR (registered trademark) of Kaneka Corporation.

(Polyester-Based Elastomer (B-3))

Specific examples of the polyester-based elastomer (B-3) include a block copolymer of an aromatic polyester and an aliphatic polyester, and a block copolymer of an aromatic polyester and an aliphatic polyether. Among these copolymers, the block copolymer of an aromatic polyester and an aliphatic polyether is preferred as the polyester-based elastomer (B-3).

The aromatic polyester is preferably either one or both of a polybutylene terephthalate-based resin or a polyethylene terephthalate-based resin.

The polybutylene terephthalate-based resin can be obtained by using terephthalic acid alone or a combination of terephthalic acid and isophthalic acid as a dicarboxylic acid component and using 1,4-butanediol as a diol component. However, the polybutylene terephthalate-based resin can be a resin obtained by replacing a part (less than 50 mol %) of the dicarboxylic acid component with other dicarboxylic acid component or oxycarboxylic acid component, or by replacing a part (less than 50 mol %) of the diol component with a low molecular weight diol component other than the butanediol component.

The polyethylene terephthalate-based resin can be obtained by using terephthalic acid alone as a dicarboxylic acid component or a combination of terephthalic acid and isophthalic acid as a dicarboxylic acid component, and using ethylene glycol as a diol component. However, the polyethylene terephthalate-based resin can be a resin obtained by replacing a part (less than 50 mol %) of the dicarboxylic acid component with other dicarboxylic acid component or oxycarboxylic acid component, or by replacing a part (less than 50 mol %) of the diol component with a low molecular weight diol component other than the ethylene glycol component.

The aliphatic polyether is preferably a polyalkylene glycol-based resin. Among the polyalkylene glycol-based resins, preferable are one or both of a polytetramethylene glycol-based resin and a polyethylene glycol-based resin.

The polyalkylene glycol-based resin can be an aliphatic polyether containing polyalkylene glycol as a main component thereof. However, the polyalkylene glycol-based resin may be an aliphatic polyether in which a part (less than 50% by mass) of the polyether portion is replaced with a dioxy component other than the alkylene glycol component.

The polytetramethylene glycol-based resin can be a polyalkylene glycol containing polytetramethylene glycol as a main component thereof. However, the polytetramethylene glycol-based resin may be an aliphatic polyether in which a part (less than 50% by mass) of the aliphatic polyether portion is replaced with a dioxy component other than the tetramethylene glycol component.

The polyethylene glycol-based resin can be a polyalkylene glycol containing polyethylene glycol as a main component thereof. However, the polyethylene glycol-based resin may be an aliphatic polyether in which a part (less than 50% by mass) of the aliphatic polyether portion is replaced with a dioxy component other than the ethylene glycol component.

When the whole of the resin or region (for example, aliphatic polyether portion) is defined as 100% by mass, the term "main" as used herein refers to a situation where 50% by mass or more is being occupied.

Examples of commercially available products of the polyester-based elastomer (B-3) include HYTREL (registered trademark) of Du Pont-Toray Co., Ltd., PELPRENE (registered trademark) of Toyobo Co., Ltd., and PRIMALLOY (registered trademark) of Mitsubishi Chemical Corporation.

(Polyamide-Based Elastomer (B-4))

Specific examples of the polyamide-based elastomer (B-4) include polyamide resins, such as aliphatic polyamides (nylon 6, nylon 11, nylon 12, nylon 66, nylon 610, and nylon 612), block copolymers of polyamide and aliphatic polyester, and block copolymers of polyamide and aliphatic polyether.

Examples of commercially available products of the polyamide-based elastomer (B-4) include UBESTA (registered trademark) of Ube Industries, Ltd., DAIAMID (registered trademark) and VESTAMID E (registered trademark) of Daicel-Evonik Ltd., and PEBAX (registered trademark) of Arkema Co., Ltd.

[Other Polymers]

As long as the effects of the present invention are not impaired, the resin composition (X) may contain other conventional resins or the below-mentioned additives. Typical examples of other resins include a low density, medium density, or high density polyethylene, a high pressure method low density polyethylene, an isotactic polypropylene, a syndiotactic polypropylene, poly 1-butene, poly 4-methyl-1-pentene, poly 3-methyl-1-butene, a cyclic olefin copolymer, a chlorinated polyolefin, a thermoplastic polyurethane, or the like.

[Additives]

The resin composition (X) may contain secondary additives within the range that does not impair the effects of the present invention. Examples of the secondary additives include, but are not limited to, a plasticizer, an ultraviolet absorber, an infrared absorber, a fluorescent whitening agent, a mold release agent, an antibacterial agent, a nucleating agent, a thermal stabilizer, an antioxidant, a slip agent, an antistatic agent, a coloring inhibitor, an adjuster, a matting agent, an antifoaming agent, a preservative, a gelling agent, a latex, a filler, an ink, a coloring agent, a dye, a pigment, and a perfume. These secondary additives may be used alone or in combination thereof.

Examples of the plasticizer include an aromatic carboxylic acid ester (dibutyl phthalate or the like), an aliphatic carboxylic acid ester (methyl acetyl ricinoleate or the like), an aliphatic dicarboxylic acid ester (adipic acid-propylene glycol-based polyester or the like), an aliphatic tricarboxylic acid ester (triethyl citrate or the like), a phosphate tri-ester (triphenyl phosphate or the like), an epoxy fatty acid ester (epoxybutyl stearate or the like), and a petroleum resin.

Examples of the mold release agent include a lower ($C_1$ to $C_4$) alcohol ester of a higher fatty acid (butyl stearate or the like), a polyhydric alcohol ester of a fatty acid ($C_4$ to $C_{30}$) (hydrogenated castor oil or the like), a glycol ester of a fatty acid, and a liquid paraffin.

Examples of the antioxidant include antioxidants such as a phenol-based antioxidant (2,6-di-t-butyl-4-methylphenol or the like), a polycyclic phenol-based antioxidant (2,2'-methylenebis(4-methyl-6-t-butylphenol) or the like), a phosphorus-based antioxidant (tetrakis(2,4-di-t-butylphenyl)-4, 4-biphenylene diphosphonate or the like), and an amine-based antioxidant (N,N-diisopropyl-p-phenylenediamine or the like).

Examples of the ultraviolet absorber include ultraviolet absorbers such as a benzotriazole-based ultraviolet absorber, a benzophenone-based ultraviolet absorber, a salicylic acid-based ultraviolet absorber, and an acrylate-based ultraviolet absorber.

Examples of the antibacterial agent include a quaternary ammonium salt, a pyridine-based compound, an organic acid, an organic acid ester, a halogenated phenol, and an organic iodine.

As the surfactant, nonionic, anionic, cationic, and amphoteric surfactants can be mentioned. Examples of the nonionic surfactant include polyethylene glycol type nonionic surfactants such as higher alcohol ethylene oxide adducts, fatty acid ethylene oxide adducts, higher alkylamine ethylene oxide adducts, and polypropylene glycol ethylene oxide adducts; and polyhydric alcohol type nonionic surfactants such as polyethylene oxide, fatty acid esters of glycerin, fatty acid esters of pentaerythritol, fatty acid esters of sorbitol or sorbitan, alkyl ethers of polyhydric alcohols, and aliphatic amides of alkanolamines. Examples of the anionic surfactant include sulfuric acid ester salts such as alkali metal salts of higher fatty acids; sulfonic acid salts such as alkylbenzenesulfonic acid salts or alkylsulfonic acid salts, and paraffin sulfonic acid salts; and phosphoric acid ester salts such as higher alcohol phosphoric acid ester salts. Examples of the cationic surfactant include quaternary ammonium salts such as alkyltrimethylammonium salts. Examples of the amphoteric surfactant include amino acid type amphoteric surfactants such as higher alkyl aminopropionate salts; and betaine type amphoteric surfactants such as higher alkyl dimethyl betaine and higher alkyl dihydroxyethyl betaine.

Examples of the antistatic agent include the surfactant, the fatty acid ester, and the polymer type antistatic agent. Examples of the fatty acid ester include esters of stearic acid and esters of oleic acid, and examples of the polymer type antistatic agent include polyether ester amides.

Examples of the pigment include inorganic pigments (titanium oxide, iron oxide, chromium oxide, cadmium sulfide, and the like), and organic pigments (azolake-based pigment, thioindigo-based pigment, phthalocyanine-based pigment, anthraquinone-based pigment, and the like). Examples of the dye include azo-based dyes, anthraquinone-based dyes, and triphenylmethane-based dyes. There is no particular limitation to the amount of these pigments and dyes to be added, but it is preferably 5 parts by mass or less, and more preferably 0.1 parts by mass or more and 3 parts by mass or less in total, relative to 100 parts by mass of the copolymer (A).

Examples of the slip agent include wax (carnauba wax and the like), higher fatty acid (stearic acid and the like), higher fatty acid salt (calcium stearate and the like), higher alcohol (stearyl alcohol and the like), and higher fatty acid amide (stearic acid amide, erucic acid amide, and the like).

The amount of each of the various additives to be added can be determined within the range that does not impair the object of the present invention, based on the use of the invention. The amount is preferably 0.01 parts by mass or more and 30 parts by mass or less in total, relative to the 4-methyl-1-pentene/α-olefin polymer (A).

2. Surface Layer (Z)

The surface layer (Z) is a layer which is at least partly in contact with the core layer (Y) and which includes a thermoplastic elastomer (C). As the thermoplastic elastomer (C), elastomers which are the same as the thermoplastic elastomer (B) described above can be used. The thermoplastic elastomer (C) may be the same as or different from the thermoplastic elastomer (B).

From the viewpoint of enhancing the peel strength of the laminate, the thermoplastic elastomer (C) is preferably the polyolefin-based elastomer (B-1), the polystyrene-based elastomer (B-2), or the polyamide-based elastomer (B-4), and more preferably the polyolefin-based elastomer (B-1) or the polystyrene-based elastomer (B-2).

From the viewpoint of enhancing moldability and mechanical properties, the thermoplastic elastomer (C) is preferably a dynamically crosslinked product. For example, thermoplastic elastomer (C) may be a thermoplastic elastomer in which a rubber component is partially crosslinked in a hard segment of a polyolefin-based resin or the like.

On the other hand, the thermoplastic elastomer (C) may be a non-crosslinked elastomer.

(Dynamically Crosslinked Product)

The phrase "partially crosslinked" means that the gel content measured by the below-mentioned method is 0% by weight or more and 90% by weight or less. The gel content is preferably 20% by weight or more and 90% by weight or less, more preferably 40% by weight or more and 90% by weight. When the gel content exceeds 90% by weight, the integral moldability with the base material layer deteriorates and, therefore, in some cases, integral molding becomes difficult.

The gel content of the thermoplastic elastomer (C) is preferably within the above-specified range because the moldability and the mechanical properties are increased, particularly when a formed stretchable structure has a small thickness (for example, a thickness of 500 μm or less).

(Method of Measuring Gel Content)

As a sample, approximately 100 mg of thermoplastic elastomer pellets (size: 0.5×0.5×0.5 mm) are weighed, and the sample is immersed in a sufficient amount, namely 30 ml, of cyclohexane at 23° C. for 48 hours in a sealed container.

Thereafter, the immersed sample is taken out on a filter paper and dried at room temperature for 72 hours or more until the sample reaches a constant weight. The weight of all of the cyclohexane-insoluble components (i.e., a fibrous filler, a filler, a pigment, and the like) exclusive of the polymer component and the weight of the hard segment component (for example, below-mentioned crystalline polyolefin resin (C-1)) in the sample before immersion in cyclohexane are subtracted from the thus obtained weight of the dry residue and used as a "corrected final weight (Y)".

On the other hand, the weight of the soft segment (for example, below-mentioned olefin-based rubber (C-2)) in the sample [that is, the weight obtained by subtracting from the weight of the sample, the weights of (1) cyclohexane-soluble components exclusive of the soft segment (for example, a mineral oil or a plasticizer), (2) hard segment components, and (3) cyclohexane-insoluble components (a fibrous filler, a bulking agent, a pigment, and the like) exclusive of the polymer component] is used as a "corrected initial weight (X)".

From (Y) and (X) above, the gel content is obtained by the following equation.

Gel content [% by weight]=[corrected final weight (Y)]/[corrected initial weight (X)]×100

(Method for Producing Dynamically Crosslinked Product)

The dynamically crosslinked product is obtained by dynamically heat-treating a mixture containing a material of a hard segment, a material of a soft segment, and a softener used as required, in the presence of an organic peroxide.

The organic peroxide is preferably a saturated aliphatic compound having one or two peroxide bonds in the molecule thereof and also having a structure such that the value obtained by dividing the molecular weight by the number of peroxide bonds in one molecule is 200 or less.

Examples of the organic peroxide include hydroperoxides such as t-butyl hydroperoxide (molecular weight: 90.1, number of peroxide bonds: 1), 1,1,3,3-tetramethylbutyl hydroperoxide (molecular weight: 146.2, number of peroxide bonds: 1), and 2,5-dimethylhexane-2,5-dihydroperoxide (molecular weight: 178.2, number of peroxide bonds: 2);

diallyl peroxides such as di-t-butyl peroxide (molecular weight: 146.2, number of peroxide bonds: 1);

diacyl peroxides such as the diacetyl peroxide (molecular weight: 118.1, number of peroxide bonds: 1), dipropionyl peroxide (molecular weight: 146.1, number of peroxide bonds: 1), and diisobutyryl peroxide (molecular weight: 174.2, number of peroxide bonds: 1);

peroxyketals such as 2,2-di-t-butylperoxybutane (molecular weight: 234.3, number of peroxide bonds: 2) and 2,5-dimethyl-2,5-di(t-butylperoxy)hexane (molecular weight: 290.4, number of peroxide bonds: 2);

peroxy esters such as t-butyl peroxyisobutyrate (molecular weight: 160.2, number of peroxide bonds: 1), t-butyl peroxyacetate (molecular weight: 132.2, number of peroxide bonds: 1), t-butyl peroxypivalate (molecular weight: 174.2, number of peroxide bonds: 1), and di(t-butylperoxy)adipate (molecular weight: 290.4, number of peroxide bonds: 2); and ketone peroxides such as methyl ethyl ketone peroxide (molecular weight: 136.2, number of peroxide bonds: 2), and methyl isobutyl ketone peroxide (molecular weight: 232.3, number of peroxide bonds: 2).

Among the specific examples of the organic peroxide, from the viewpoint of safety, an organic peroxide having a flash point of 40° C. or higher is preferable, and an organic peroxide having a flash point of 50° C. or higher is more preferable. In particular, 2,5-dimethyl-2,5-di(t-butylperoxy) hexane is preferable.

When the total amount of the hard segment and the olefin-based rubber (C-2) is 100 parts by mass, the content of the organic peroxide is preferably 0.05 parts by mass or more and 3 parts by mass or less, and more preferably 0.1 parts by mass or more and 1 part by mass or less.

In order to facilitate a uniform and moderate crosslinking reaction during dynamic heat treatment in the presence of an organic peroxide, use can be made of sulfur; a peroxy crosslinking aid such as p-quinonedioxime, p,p'-dibenzoylquinonedioxime, N-methyl-N-4-dinitrosoaniline, nitrosobenzene, diphenylguanidine, or trimethylolpropane-N,N'-m-phenylenedimaleimide; and a polyfunctional monomer, for example, a polyfunctional methacrylate monomer (such as divinylbenzene, triallyl cyanurate, ethylene glycol di-methacrylate, diethylene glycol dimethacrylate, polyethylene glycol dimethacrylate, trimethylolpropane trimethacrylate, or allyl methacrylate), or a polyfunctional vinyl monomer (such as vinyl butyrate or vinyl stearate).

Among the crosslinking aids and polyfunctional vinyl monomers, divinylbenzene is preferable. Divinylbenzene is easy to handle, exhibits good compatibility with the hard segment and the olefin-based rubber (C-2), and has an ability to solubilize an organic peroxide and therefore functions as a dispersant for the organic peroxide. Therefore, when divinylbenzene is used, crosslinking effect of heat treatment becomes homogeneous and a stretchable structure having well balanced fluidity and mechanical properties during molding can be obtained.

When the total amount of the hard segment and the soft segment is 100 parts by mass, the content of the crosslinking aid and the polyfunctional vinyl monomer is preferably 0.1% by mass or more and 2% by mass or less, and more preferably 0.3% by mass or more and 1% by mass or less. When the content of the crosslinking aid or the polyfunctional vinyl monomer exceeds 2% by weight, in the case where the amount of the organic peroxide to be incorporated is large, the crosslinking reaction proceeds too rapidly in the case where the amount of the organic peroxide to be incorporated is large, so that the fluidity at the time of molding of the resulting stretchable structure may decrease. On the other hand, when the content of the crosslinking aid or the polyfunctional vinyl monomer exceeds 2% by weight, in the case where the amount of the organic peroxide to be incorporated is small, the crosslinking aid or the polyfunctional vinyl monomer remains in the thermoplastic elastomer as an unreacted compound or monomer, and the stretchable structure may suffer from changes in physical properties caused by thermal history during processing and molding.

The phrase "dynamically heat-treating" means kneading the above-mentioned respective components in a molten state. As the kneading apparatus, a kneading apparatus known in the related art, such as an open type mixing roll, a non-open type Banbury mixer, an extruder, a kneader, or a continuous mixer is used. Among them, a non-open type kneading apparatus is preferable, and kneading is preferably carried out in an atmosphere of an inert gas such as nitrogen gas or carbon dioxide gas.

The kneading is preferably carried out at a temperature at which the half-life of the organic peroxide used becomes less than 1 minute. The kneading temperature is preferably 150° C. or higher and 280° C. or lower, and more preferably 170° C. or higher and 240° C. or lower. The kneading time is preferably 1 minute or more and 20 minutes or less, and more preferably 3 minutes or more and 10 minutes or less. The applied shear force may be determined from a range where the shear rate is 10 sec$^{-1}$ or more and 100,000 sec$^{-1}$ or less, and preferably 100 sec$^{-1}$ or more and 10,000 sec$^{-1}$ or less.

The thermoplastic elastomer (C) is obtained by heat-treating the pellets obtained by the dynamic heat treatment in a high temperature atmosphere to volatilize and remove the organic peroxide (crosslinking agent) and decomposition products thereof which are remaining in the pellets. The temperature of the heat treatment for volatilization and removal can be a temperature around 70° C. or lower than the melting point of this pellet. The time required for the heat treatment for volatilization and removal depends on the heat treatment temperature, but it is usually 1 hour or more and 10 hours or less. This heat treatment is carried out under atmospheric pressure or under reduced pressure. In particular, in the case where this heat treatment for volatilization and removal is carried out under the conditions as described above, a stretchable structure having excellent fogging resistance can be obtained.

When the thermoplastic elastomer (C) is produced using a vent type extruder having a first stage (primary extrusion portion), a vent portion having a vent hole, and a second stage (secondary extrusion portion), after carrying out the dynamic heat treatment in the first stage, the organic peroxide (crosslinking agent) and decomposition product thereof remaining in the pellets may be removed by vacuum suction from the vent hole provided in the vent portion. The thermoplastic elastomer (C) obtained through such a process further enhances the fogging resistance of the stretchable structure.

Example of Dynamically Crosslinked Product

As the polyolefin-based elastomer (B-1) used as the thermoplastic elastomer (C) which is a dynamically crosslinked product, also preferred is a partially crosslinked elastomer which is obtained by dynamically heat-treating the above-described second embodiment which is a mixture of the crystalline polyolefin resin (C-1) and the olefin-based rubber (C-2) in the presence of a specific organic peroxide.

(Crystalline Polyolefin Resin (C-1))

Examples of the crystalline polyolefin resin (C-1) include homopolymers or copolymers of α-olefins having 2 to 20 carbon atoms. These crystalline polyolefin resins (C-1) can be used alone or in combination thereof.

Specific examples of the crystalline polyolefin resin (C-1) include the following polymers or copolymers.

(1) an ethylene homopolymer (production method may be any of a low pressure method and a high pressure method), (2) a copolymer of ethylene and 10 mol % or less of other α-olefin or vinyl monomer (examples of vinyl monomer include vinyl acetate and ethyl acrylate), (3) a propylene homopolymer, (4) a random copolymer of propylene and 10 mol % or less of other α-olefin, (5) a block copolymer of propylene and 30 mol % or less of other α-olefin, (6) a 1-butene homopolymer, (7) a random copolymer of 1-butene and 10 mol % or less of other α-olefin, (8) a 4-methyl-1-pentene homopolymer, and (9) a random copolymer of 4-methyl-1-pentene and 20 mol % or less of other α-olefin.

Examples of the above-mentioned α-olefin include ethylene, propylene, 1-butene, 4-methyl-1-pentene, 1-hexene, and 1-octene.

Among the specific examples of the crystalline polyolefin resin (C-1), (3) a propylene homopolymer, (4) a random copolymer of propylene and 10 mol % or less of other α-olefin, and (5) a block copolymer of propylene and 30 mol % or less of other α-olefin are more preferred.

Melt flow rate (MFR: measured at 230° C. under a load of 2.16 kg in accordance with ASTM D1238) of the crystalline polyolefin resin (C-1) is preferably 0.01 g/10 min or more and 100 g/10 min or less, and more preferably 0.3 g/10 min or more and 60 g/10 min or less.

The crystallinity of the crystalline polyolefin resin (C-1), as determined by an X-ray method, is preferably 5% or more and 90% or less and more preferably 10% or more and 85% or less.

When the total amount of the crystalline polyolefin resin (C-1) and the olefin-based rubber (C-2) is 100 parts by mass, the content of the crystalline polyolefin resin (C-1) is preferably 15 parts by mass or more and 70 parts by mass or less, more preferably 20 parts by mass or more and 60 parts by mass or less, and still more preferably 25 parts by mass or more and 55 parts by mass or less. When the content of the crystalline polyolefin resin (C-1) is in the above-specified range, the heat resistance, stretchability, and moldability of the stretchable structure are further improved.

(Olefin-Based Rubber (C-2))

The olefin-based rubber (C-2) is an amorphous random elastic copolymer containing an α-olefin having 2 to 20 carbon atoms as a main component.

Examples of the olefin-based rubber (C-2) include an amorphous α-olefin copolymer consisting of two or more α-olefins, and an α-olefin/non-conjugated diene copolymer consisting of two or more α-olefins and non-conjugated diene.

Specific examples of the olefin-based rubber (C-2) include the following copolymer rubbers.

(1) an ethylene/α-olefin copolymer rubber [ethylene/α-olefin (molar ratio)=about 90/10 to 50/50], (2) an ethylene/α-olefin/non-conjugated diene copolymer rubber [ethylene/α-olefin (molar ratio)=about 90/10 to 50/50], (3) a propylene/α-olefin copolymer rubber [propylene/α-olefin (molar ratio)=about 90/10 to 50/50], and (4) a butane/α-olefin copolymer rubber [butene/α-olefin (molar ratio)=about 90/10 to 50/50].

Examples of the α-olefin include ethylene, propylene, 1-butene, 4-methyl-1-pentene, 1-hexene, and 1-octene.

Examples of the non-conjugated diene include dicyclopentadiene, 1,4-hexadiene, cyclooctadiene, methylene norbornene, and ethylidene norbornene.

In addition, (2) ethylene/α-olefin/non-conjugated diene copolymer rubber preferably has an iodine value of 25 or less.

The copolymer rubbers (1) to (4) preferably have a Mooney viscosity ML1+4 (100° C.) of 10 or more and 250 or less, and more preferably 40 or more and 150 or less.

The copolymer rubbers (1) to (4) may be used in combination with other rubbers. Examples of the "other rubbers" include a diene-based rubber such as styrene/butadiene rubber (SBR), nitrile rubber (NBR), or isobutylene rubber (IR); a natural rubber (NR); and a butyl rubber (IIR).

When the total amount of the crystalline polyolefin resin (C-1) and the olefin-based rubber (C-2) is 100 parts by mass, the content of the "other rubbers" is preferably 40 parts by mass or less, and more preferably 5 parts by mass or more and 20 parts by mass or less.

When the total amount of the crystalline polyolefin resin (C-1) and the olefin-based rubber (C-2) is 100 parts by mass, the content of the olefin-based rubber (C-2) is preferably 30 parts by mass or more and 85 parts by mass or less, more preferably 40 parts by mass or more and 80 parts by mass or less, and still more preferably 45 parts by mass or more and 75 parts by mass or less. When the content of the olefin-based rubber (C-2) is within the above-specified range, the fogging resistance and flexibility of the stretchable structure are increased further.

(Other Additives)

The thermoplastic elastomer (C) may contain a softener commonly used for a rubber.

Examples of the softener include petroleum-based substances such as process oil, lubricating oil, paraffin, liquid paraffin, petroleum asphalt, and petroleum; coal tars such as coal tar and coal tar pitch; fatty oils such as castor oil, linseed oil, rapeseed oil, soybean oil, and coconut oil; waxes such as tall oil, beeswax, carnauba wax, and lanolin; fatty acids such as ricinoleic acid, palmitic acid, and stearic acid, and metal salts thereof; synthetic polymers such as petroleum resins, coumarone-indene resins, and atactic polypropylene; ester-based plasticizers such as dioctyl phthalate, dioctyl adipate, and dioctyl sebacate; microcrystalline wax and liquid polybutadiene, modified products thereof, and hydrogenated products thereof; and liquid thiokol.

When the total mass of the thermoplastic elastomer (C) is 100 parts by mass, the content of the softener is preferably 1 part by mass or more and 20 parts by mass or less, and more preferably 3 parts by mass or more and 15 parts by mass or less. When the content of the softener is within the above-specified range, the fluidity and mechanical properties are enhanced further during the molding of the stretchable structure.

In addition, the thermoplastic elastomer (C) may contain an additive such as a heat-resistant stabilizer, an antistatic agent, a weathering stabilizer, an antioxidant, a filler, a coloring agent, or a lubricant, if necessary, as long as it does not impair the object of the present invention.

(Non-Crosslinked Elastomer)

The thermoplastic elastomer (C) which is a non-crosslinked elastomer can be, for example, the first embodiment of the polyolefin-based elastomer (B-1) described above. Of these, an ethylene-based elastomer and a propylene-based elastomer can be used.

As the ethylene-based elastomer, a homopolymer of ethylene or a copolymer of ethylene and an α-olefin having 4 to 20 carbon atoms can be used. Examples of the α-olefin include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methy-1-decene, 11-methyl-1-dodecene, and 12-ethyl-1-tetradecene. Of these, 1-butene, 1-hexene, 1-heptene, or 1-octene is preferable, and 1-octene is more preferable.

The ethylene-based elastomer as the above copolymer preferably has an α-olefin content of 5 mol % or more and 50 mol % or less, more preferably 7 mol % or more and 40 mol % or less, still more preferably 8 mol % or more and 30 mol % or less, and particularly preferably 8 mol % or more and 18 mol % or less. When the α-olefin content is within the above-specified range, the stretchable structure is excellent in mechanical properties (such as tensile properties and impact resistance), blocking resistance, slipping properties, low temperature heat sealing properties, and the like.

As the propylene-based elastomer, a homopolymer of propylene or a copolymer of propylene and an α-olefin having 4 to 20 carbon atoms can be used. Examples of the α-olefin include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene. Of these, 1-butene, 1-hexene, 1-heptene, or 1-octene is preferable, and 1-butene is more preferable.

The propylene-based elastomer as the above copolymer preferably has an α-olefin content of 5 mol % or more and 50 mol % or less, more preferably 7 mol % or more and 40 mol % or less, still more preferably 8 mol % or more and 30 mol % or less, and particularly preferably 8 mol % or more and 18 mol % or less. When the α-olefin content is within the above-specified range, the stretchable structure is excellent in mechanical properties (such as tensile properties and impact resistance), blocking resistance, slipping properties, low temperature heat sealing properties, and the like.

The ethylene-based elastomer and the propylene-based elastomer each preferably has a density of 0.870 g/cm$^3$ or more and 0.900 g/cm$^3$ or less, and more preferably 0.875 g/cm$^3$ or more and 0.895 g/cm$^3$ or less.

The ethylene-based elastomer and the propylene-based elastomer each preferably has a melt flow rate (MFR: measured at 230° C. under a load of 2.16 kg in accordance with ASTM D1238) of 0.01 g/10 minutes or more and 100 g/10 minutes or less, preferably 0.01 g/10 minutes or more and 50 g/10 minutes or less, and still more preferably 0.1 g/10 minutes or more and 20 g/10 minutes or less. When the MFR is in the above-specified range, the stretchable structure has improved moldability and the like.

Examples of the ethylene-based elastomer and the propylene-based elastomer include compounds which are the same as the above-mentioned examples of the polyolefin-based elastomer (B-1). Specific examples include products sold under the trade name DYNARON (registered trademark) of JSR Corporation, trade names TAFMER (registered trademark) and NOTIO (registered trademark) of Mitsui Chemicals, Inc., trade names ENGAGE (registered trademark) and VERSIFY (registered trademark) of Dow Chemical Co., Ltd., and trade name Vistamaxx (registered trademark) of Exxon Mobil Chemical Co., Ltd.

3. Specific Examples of Strechable Structure

The stretchable structure has, for example, a multilayered filament structure or a multilayered sheet structure.

(Stretchable Structure Having a Multilayered Filament Structure)

From the viewpoint of enhancing the secondary processability, the stretchable structure having a multilayered filament structure preferably has a diameter of 3 μm or more and 5,000 μm or less, more preferably 10 μm or more and 2,000 μm or less, still more preferably 10 μm or more and 1,000 μm or less, and particularly preferably 10 μm or more and 500 μm or less.

From the viewpoint of enhancing the stress relaxation properties and thus obtaining a more flexible filament, the stretchable structure having a multilayered filament structure preferably has a core layer (Y)/surface layer (Z) volume ratio of 1/99 to 99/1 (vol %/vol %), more preferably 40/60 to 95/5 (vol %/vol %), and still more preferably 45/55 to 90/10 (vol %/vol %). The volume ratio is a value obtained from a transmission electron microscope image described below.

The stretchable structure having a multilayered filament structure has a 3% stretch modulus and a 50% stretch modulus, both measured in accordance with JIS L1013, of preferably 50% or more and 100% or less, more preferably 60% or more and 99 or less, and still more preferably 70% or more and 99% or less.

From the viewpoint of obtaining a filament having excellent stretchability by making it difficult to undergo plastic deformation upon repeated stretching, the difference between the 3% stretch modulus value and the 50% stretch modulus value of the stretchable structure having a multilayered filament structure, both measured in accordance with JIS L1013, is preferably 50% or less and more preferably 30% or less.

From the viewpoint of obtaining a filament having excellent balance between tensile strength and elongation, the stretchable structure having a multilayered filament structure has a tensile elongation percentage of preferably 30% or more and 500% or less, more preferably 50% or more and 200% or less, and still more preferably 50% or more and 150% or less, measured in accordance with JIS L1013 (measured at 20° C. and 65% RH, or at 20° C. and 95% RH). When the tensile elongation percentage is 30% or more, a spun yarn or a secondary processed body obtained from the stretchable structure exhibits excellent stretchability. On the other hand, particularly when the stretchable structure having a multilayered filament structure is an undrawn yarn, handleability at the time of stretching becomes satisfactory and the mechanical properties can be improved by stretching when the tensile elongation percentage is 300% or less.

From the viewpoint of obtaining a filament capable of forming a secondary processed product which has excellent stress relaxation properties at the time of tension and less tightening upon wearing, the tensile stress relaxation rate of the stretchable structure at 10% elongation is preferably 40% or more, more preferably 50% or more, and still more preferably 60% or more. The upper limit value of the tensile stress relaxation rate can be set to 100% or less.

From the viewpoint of obtaining a filament capable of forming a lighter secondary processed product, the stretchable structure having a multilayered filament structure preferably has a specific gravity of 0.91 or less as measured in accordance with JIS L1013. The lower limit value of the specific gravity is not particularly limited, but is usually 0.82 or more.

From the viewpoint of obtaining a filament having less yarn breakage, good process passability during production, and excellent durability, the stretchable structure having a multilayered filament structure has a tensile strength of preferably 0.2 cN/dtex or more and 7.0 cN/dtex or less, more preferably 0.2 cN/dtex or more and 5.0 cN/dtex or less, and still more preferably 0.4 cN/dtex or more and 4.0 cN/dtex or less.

From the viewpoint of obtaining a filament showing similar characteristics under both dry and water-wet conditions, ratio of a tensile strength measured at 20° C. under 95% RH and a tensile strength measured at 20° C. under 65% RH (tensile strength under 95% RH/tensile strength under 65% RH) of the stretchable structure having a multilayered filament structure is preferably 0.7 or more and 1.5 or less, and more preferably 0.8 or more and 1.3 or less.

From the viewpoint of obtaining a filament having good process passability during production and excellent handleability and mechanical properties, the stretchable structure having a multilayered filament structure has an initial tensile resistance of preferably 0.01 N/dtex or more and 5.0 N/dtex or less, more preferably 0.05 N/dtex or more and 0.80 N/dtex or less, and still more preferably 0.05 N/dtex or more and 0.6 N/dtex or less.

From the viewpoint of obtaining a filament excellent in flexibility and stretchability, the stretchable structure having a multilayered filament structure has an apparent Young's modulus of preferably 10 N/mm$^2$ or more and 1,000 N/mm$^2$ or less, more preferably 15 N/mm$^2$ or more and 800 N/mm$^2$ or less, and still more preferably 25 N/mm$^2$ or more and 600 N/mm$^2$ or less.

(Method for Producing a Stretchable Structure Having a Multilayered Filament Structure)

There is no particular limitation with respect to (the molding method of) the stretchable structure having a multilayered filament structure, and for example, there can be mentioned a method of coextruding a material for molding a base material layer and a material for molding a surface layer, and producing a laminate having the base material layer and the surface layer (hereinafter, also referred to as "coextrusion method").

(Stretchable Structure Having a Multilayered Sheet Structure)

From the viewpoint of ease in handling, the stretchable structure having a multilayered sheet structure preferably has a thickness of 20 μm or more and 1,000 μm or less, more preferably 20 μm or more and 500 μm or less, and still more preferably 50 μm or more and 350 μm or less.

From the viewpoint of increasing the stress relaxation properties for obtaining a more flexible filament, the stretchable structure having a multilayered sheet structure has a core layer (Y)/surface layer (Z) volume ratio (ratio of the thickness) of preferably 1/99 to 99/1 (vol %/vol %), more preferably 5/99 to 99/5 (vol %/vol %), still more preferably 20/80 to 95/5, and particularly preferably 30/70 to 95/5 (vol %/vol %). The volume ratio is a value obtained from a transmission electron microscope image described below.

From the viewpoint of forming an excellent stretchable sheet, the stretchable structure having a multilayered sheet structure preferably has a break elongation, measured in accordance with JIS K 7127, of 100% or more and 1,000% or less, more preferably 150% or more and 800% or less, and still more preferably 200% or more and 700% or less.

From the viewpoint of forming a sheet with high strength, the stretchable structure having a multilayered sheet structure preferably has a rupture strength, as measured in accordance with JIS K7127, of 5 MPa or more and 50 MPa or less, more preferably 8 MPa or more and 40 MPa or less, and still more preferably 10 MPa or more and 30 MPa or less.

From the viewpoint of forming a flexible and stretchable sheet, the stretchable structure having a multilayered sheet structure preferably has an elastic modulus, as measured in accordance with JIS K7127, of 10 MPa or more and 1,000 MPa or less, more preferably 15 MPa or more and 800 MPa or less, and still more preferably 25 MPa or more and 600 MPa or less.

From the viewpoint of obtaining a sheet capable of forming a secondary processed product which has excellent stress relaxation properties at the time of tension and less tightening upon wearing, the tensile stress relaxation rate of the stretchable structure having a multilayered sheet structure at 100% stretching is 40% or more, more preferably 50% or more, and still more preferably 60% or more. The upper limit value of the tensile stress relaxation rate can be set to 100% or less.

(Method for Producing Stretchable Structure Having Multilayered Sheet Structure)

There is no particular limitation with respect to (the molding method of) the stretchable structure having a multilayered sheet structure, and examples include:

(1) a method of coextruding a material for molding a base material layer and a material for molding a surface layer, thereby producing a laminate having the base material layer and the surface layer (hereinafter, also referred to as "coextrusion method");

(2) a method in which a base material layer and a surface layer are individually molded in advance, and the molded base material layer and surface layer are thermally fused (hereinafter, also referred to as "thermal fusion method"); and (3) a method in which one of a base material layer and a surface layer is molded in advance, and the other of the layers is laminated on the surface of the molded layer by extrusion coating (hereinafter, also referred to as "extrusion coating method").

Among the above-mentioned methods, the coextrusion method is preferable from the viewpoint of ease in production.

4. Applicable of the Strechable Structure

The stretchable structure of the present invention has features such as high stress relaxation properties and stretchability, together with slow relaxation. The stretchable structure of the present invention can be used for conventional applications, such as clothing materials, medical materials, sanitary materials, fishing materials, agricultural and forestry materials, civil engineering construction materials, shoe materials, sports materials, leisure materials, and industrial materials. Further, in the above applications, lamination of the surface with a cloth enables the suppression of abrasion and scratching which causes deterioration.

Examples of clothing materials include innerwears such as underwears, socks, shirts, briefs, trunks, shorts, camisoles, spats, bras, tights, and belly bands; outerwears such as T-shirts, sweaters, coats, jackets, jumpers, pants, skirts, hats, and gloves; and sportswears such as training wears, ski wears, swimming suits, leotards, and supporters.

In addition, examples of medical materials include bandages and poultice materials.

In addition, examples of sanitary materials include diapers, sanitary products, birth pads, breast-feeding pads, mask strings, eye band cords, and wound dressings.

In addition, examples of fishing materials include layer nets, winding nets, aquaculture fish nets, and aquaculture nets.

In addition, examples of agricultural and forestry materials include fly wires, windshield nets, shading nets, weed prevention nets, bird nets, cucumber nets, and flower nets.

In addition, examples of civil engineering construction materials include vegetation net and sandbag nets.

In addition, examples of shoe materials include shoes skin materials and shoelaces.

In addition, examples of sports materials and leisure materials include nets for sports such as golf, baseball, tennis, table tennis, volleyball, badminton, soccer, handball, basketball, hockey, ice hockey, and water balls; shoes skin materials; and insect nets.

In addition, examples of industrial materials include toys.

Further, the stretchable structure having a multilayered filament structure can be processed into a secondary processed product by means of a knitting machine, weaving machine, or the like known in the related art. The secondary processed product has a net shape, a rope shape, a mesh shape, a cloth shape, or a combination thereof, and there is no limitation on its size, shape, and design. Examples of types of knitting fabrics processed by means of a knitting machine or a weaving machine include, but are not limited to, knitting fabrics such as weft knitting fabrics, warp knitting fabrics, and circular knitting fabrics; fabrics in general; knotted nets such as homme knot net, English single knot net, and English double knot net; and knotless nets such as Raschel net, moji net, woven net, and metallic•fiber net.

In addition, the stretchable structure having a multilayered filament structure can be made into a spun yarn. The spun yarn may be composed only of the stretchable structure having a multilayered filament structure or of a blend of the stretchable structure with a chemical fiber or natural fiber. Further, the above-mentioned spun yarn may be twisted with a spun yarn made of a chemical fiber or natural fiber to obtain a spun yarn. Further, the chemical fiber or natural fiber used for blending or twisting may be a single type of fiber or a plurality of different fibers used in combination.

The chemical fiber is not particularly limited and can be appropriately selected depending on the application and required properties. Specific examples of the chemical fiber include, but are not limited to, a polyester-based fiber, a polyamide-based fiber, a polyacrylonitrile-based fiber, a cellulose-based fiber, and a cellulose fiber. Among them, a polyester-based fiber, a polyamide-based fiber, a polyacrylonitrile-based fiber, a cellulose-based fiber, and the like are preferable.

Specific examples of the polyester-based fiber include polyethylene terephthalate, polypropylene terephthalate, polybutylene terephthalate, and polylactic acid. Specific examples of the polyamide-based fiber include nylon 6, nylon 66, and nylon 610. Specific examples of the polyacrylonitrile-based fiber include an acrylonitrile-methyl acrylate copolymer and an acrylonitrile-ethyl methacrylate copolymer. Specific examples of the cellulose-based fiber include cellulose diacetate, cellulose triacetate, cellulose acetate propionate, and cellulose acetate butyrate. Specific examples of the cellulose fiber include viscose rayon and cupra rayon. However, these fibers are not limited to the above exemplified fibers.

The natural fiber is not particularly limited and can be appropriately selected depending on the application and required properties. Preferred specific examples of the natural fiber include, but are not limited to, cotton, silk, hemp, and wool.

In addition, the stretchable structure having a multilayered filament structure can be made into a nonwoven fabric.

Examples of the secondary processed product include clothing materials, sanitary materials, fishing materials, agricultural and forestry materials, civil engineering construction materials, shoe materials, sports materials, leisure materials, and industrial materials.

Examples of clothing materials include innerwears such as underwears, socks, shirts, briefs, trunks, shorts, camisoles, spats, bras, tights, and belly bands; outerwears such as T-shirts, sweaters, coats, jackets, jumpers, pants, skirts, hats, and gloves; and sportswears such as training wears, ski wears, swimming suits, leotards, and supporters.

In addition, examples of sanitary materials include diapers, sanitary products, birth pads, breast-feeding pads, mask strings, eye band cords, and wound dressings.

In addition, examples of fishing materials include layer nets, winding nets, aquaculture fish nets, and aquaculture nets.

In addition, examples of agricultural and forestry materials include fly wires, windshield nets, shading nets, weed prevention nets, bird nets, cucumber nets, and flower nets.

Examples of civil engineering construction materials include vegetation nets and sandbag nets.

In addition, examples of shoe materials include shoes skin materials and shoelaces.

In addition, examples of sports materials and leisure materials include nets for sports such as golf, baseball, tennis, table tennis, volleyball, badminton, soccer, handball, basketball, hockey, ice hockey, and water balls; shoes skin materials; and insect nets.

In addition, examples of industrial materials include filament materials for three-dimensional modeling (3D printers) used for thermal fusion lamination, round cords, toys, and straps for mobile phones.

EXAMPLES

Hereinafter, the present invention will be described with reference to Examples, but the present invention is not limited to these Examples. In the following description, "parts" means parts by mass, unless otherwise mentioned.

Various physical properties referred to in the Examples and Comparative Examples were measured by the following methods.

[Composition]

The content (mol %) of each structural unit (4-methyl-1-pentene and α-olefin) in the 4-methyl-1-pentene/α-olefin copolymer (A) was measured by $^{13}$C-NMR.

Measuring device: nuclear magnetic resonance apparatus (ECP500 type, manufactured by JEOL Ltd.)
Observation nucleus: $^{13}$C (125 MHz)
Sequence: single pulse proton decoupling
Pulse width: 4.7 microseconds (45° pulse)
Repeat time: 5.5 seconds
Cumulated number: 10,000 times or more
Solvent: mixed solvent of ortho-dichlorobenzene/deuterated benzene (volume ratio: 80/20)
Sample concentration: 55 mg/0.6 mL
Measurement temperature: 120° C.
Reference value of chemical shift: 27.50 ppm

[Intrinsic Viscosity [η]]

The intrinsic viscosity [η] of the copolymer (A) was measured in a decalin solvent at 135° C. using an Ubbelohde viscometer as a measuring device.

Approximately 20 mg of the copolymer was dissolved in 25 ml of decalin and a specific viscosity $\eta_{sp}$ was measured in an oil bath at 135° C. using an Ubbelohde viscometer. After 5 ml of decalin is added to the decalin solution and diluted, the specific viscosity $\eta_{sp}$ was measured in the same manner as above. This dilution operation was repeated two more times, and the value of $\eta_{sp}/C$ extrapolated to 0 concentration (C) was obtained as the intrinsic viscosity [η] (unit: dl/g) (refer to the following equation 1).

$$[\eta]=\lim(\eta_{sp}/C)(C\to 0) \quad \text{Equation 1}$$

[Weight-Average Molecular Weight (Mw) and Molecular Weight Distribution (Mw/Mn)]

For the copolymer (A), the weight-average molecular weight (Mw) and the molecular weight distribution (Mw/Mn) represented by the ratio of the weight-average molecular weight (Mw) to the number-average molecular weight (Mn) were calculated by a standard polystyrene conversion method using gel permeation chromatography (GPC).

—Conditions—

Measuring device: GPC (Model ALC/GPC 150-C plus, differential refractometer detector integrated type, manufactured by Waters Corporation)
Column: two GMH6-HT columns (manufactured by Tosoh Corporation) and two GMH6-HTL columns (manufactured by Tosoh Corporation) connected in series
Eluent: o-dichlorobenzene
Column temperature: 140° C.
Flow rate: 1.0 mL/min

[Melt Flow Rate (MFR)]

The melt flow rate (MFR) of the copolymer (A) and polypropylene was measured under a load of 2.16 kg at 230° C. in accordance with ASTM D1238. Unit is g/10 min.

[Density]

The density of the copolymer (A) was measured in accordance with JIS K7112 (density gradient tube method). This density (kg/m$^3$) was used as an indicator of lightness.

[Melting Point (Tm)]

The melting point (Tm) of the copolymer (or core layer) was measured using a differential scanning calorimeter (Model DSC220C, manufactured by Seiko Instruments Inc.) as a measuring device. About 5 mg of the polymer (or core layer) was sealed in a measuring aluminum pan and heated from room temperature to 200° C. at 10° C./min. In order to completely melt the polymer, it is kept at 200° C. for 5 minutes and then cooled to −50° C. at 10° C./min After keeping at −50° C. for 5 minutes, heating was carried out for a second time at 200° C. and 10° C./min. The peak temperature (° C.) for the second heating was defined as the melting point (Tm) of the polymer (or core layer). When a plurality of peaks was detected, the peak detected at the highest temperature side was employed.

[Dynamic Viscoelasticity]

In the measurement of dynamic viscoelasticity, a press sheet having a thickness of 3 mm was used as a measurement sample, and a strip of 45 mm×10 mm×3 mm necessary for dynamic viscoelasticity measurement was cut out therefrom. The temperature dependence of dynamic viscoelasticity was measured at a frequency of 10 rad/s in a range of −40° C. to 150° C. using MCR301 manufactured by ANTONPaar Co., Ltd. Then, a temperature at which the loss tangent (tanδ) attributed to the glass transition temperature in the range of 0° C. to 40° C. reaches a peak value (maximum value) (hereinafter, also referred to as "peak value temperature"), and the value of the loss tangent (tanδ) at that temperature were measured.

[Mechanical Properties (Tensile Elongation at Break (EL), Tensile Rupture Strength (TS), Tensile Modulus (YM))]

A sheet having a thickness of 400 μm was cut into a dumbbell shape having a width of 25 mm×a length of 100 mm and used as a test specimen.

In accordance with JIS K7127 (1999), the tensile elongation at break (EL) (unit: %), the tensile rupture strength (TS) (unit: MPa), and the tensile modulus (YM) (unit: MPa) of the test specimen were measured using a tensile tester (universal tensile tester 3380, manufactured by Instron Corporation) under the conditions such that a gripping chuck-to-chuck distance was 50 mm, a tension rate was 200 mm/min, and a temperature was 23° C.

[Tensile Stress Relaxation Rate (%)]

Using a constant rate extension type tensile tester (Autograph AG-500C, manufactured by Shimadzu Corporation), a specimen of a sheet or filament cut into 10 mm width were stretched to 10%, 100% or 300% elongation at a gripping chuck interval of 100 mm at a speed of 100 mm/min. The stress (initial stress) was measured when the desired elongation was reached, followed by keeping the specimen at the stretched position for 60 seconds, and the change in stress while keeping the elongation was also measured. The stress relaxation rate was calculated from the difference between the initial stress and the stress 60 seconds after reaching the desired elongation.

$$SR=(F_0-F)/F_0\times 100$$

SR: tensile stress relaxation rate (%)
$F_0$: initial stress (MPa) at 10%, 100%, or 300% elongation
F: stress (MPa) at 10%, 100%, or 300% stretching and after 120 seconds

[Tensile Permanent Set/Stretch Ratio]

A sheet having a thickness of 400 μm was cut into No. 5 dumbbell shape defined in JIS K7127 and used as a test specimen.

In accordance with JIS K7127 (1999), using a tensile tester (universal tensile tester 3380, manufactured by Instron Corporation) under the conditions such that a gripping chuck-to-chuck distance was 80 mm, a tension rate was 200 mm/min, and a temperature was 23° C., the sheet was stretched to 150% elongation and kept for 10 minutes. The chucks holding the specimen were released to remove the sheet from the tester, the gripping chuck-to-chuck distance was measured at 1 minute and 10 minutes after release, and the tensile permanent set was calculated from the following equation.

$$PS=(I-I_0)/I_0\times 100$$

PS: tensile permanent set (%)
I: gripping chuck-to-chuck distance (mm) after 1 minute or 10 minutes
$I_0$: gripping chuck-to-chuck distance (mm) before testing Further, the ratio ($PS_{1M}/PS_{10M}$) of the above-obtained tensile permanent set ($PS_{10M}$) measured 10 minutes after the release and the above-obtained tensile permanent set ($PS_{1M}$) measured 1 minute after the release was defined as the stretch ratio.

[Apparent Fineness (dtex) of Filament]

The filaments obtained in the Examples were subjected to a measurement by the B method in accordance with JIS L1013 (2010).

[Core Layer (Y)/Surface Layer (Z) Ratio (vol %/vol %) of Filament]

The obtained filament was embedded in a resin, followed by trimming, and sliced into ultrathin sections after staining with ruthenium tetroxide ($RuO_4$). The thus prepared sections were observed under a transmission electron microscope (TEM) H-7650 (manufactured by Hitachi High-Technologies Corporation). From the observed image, the cross-sectional areas of the core layer (Y) and the surface layer (Z) were determined from calculations and used for obtaining an area ratio.

[Tensile Strength (cN/dtex) and Elongation at Break (%) of Filament]

In accordance with JIS L1013 (2010), using a constant rate extension type tensile tester (Autograph AG-500C, manufactured by Shimadzu Corporation), tensile strength until break was measured either at a temperature of 20° C. under a relative humidity of 65%, or at a temperature of 20° C. under a relative humidity of 95%, while setting the gripping chuck interval to 100 mm and the speed to 100 mm/min.

Further, the ratio of the tensile strength at a temperature of 20° C. and a relative humidity of 95% to the tensile strength at a temperature of 20° C. and a relative humidity of 65% was calculated as the dry and wet strength ratio (%).

[Initial Tensile Resistance (N/dtex) of Filament]

Measurement was carried out in accordance with JIS L1013 (2010) in the same manner as the measurements for the tensile strength and elongation at break under conditions such that the temperature is 20° C. and the relative humidity is 65%. A stress-elongation curve was drawn, and with respect to the change in stress leading to an elongational change closest to the origin, the maximum value of the stress change (the maximum point of the tangent angle) was determined from the curve. Then, initial tensile resistance (N/tex) was calculated based on the following equation.

$$T_{ri}=P/(l'/l)\times F0$$

$T_{ri}$: initial tensile resistance (N/tex)
P: stress at maximum point of tangent angle (N)
F0: fineness based on corrected weight (tex)
l: test length (mm)
l': length (mm) between the vertical line connecting the stress at the maximum point of the tangent angle and the horizontal axis, and the intersection of the tangent and the horizontal axis, determined from the stress-elongation curve

[Specific Gravity of Filament]

The measurement was carried out in accordance with JIS L1013.

[Apparent Young's Modulus (N/mm²) of Filament]

Measurement was carried out in accordance with JIS L1013 (2010) in the same manner as the measurements for the tensile strength and elongation at break under conditions such that the temperature is 20° C. and the relative humidity is 65%. A stress-elongation curve was drawn, and with respect to the change in stress leading to an elongational change closest to the origin, the maximum value of the stress change (the maximum point of the contact angle) was calculated. After calculating the initial tensile resistance (N/tex), the apparent Young's modulus was calculated by the following equation.

$YM = 1000 \times \rho \times T_{ri}$

YM: apparent Young's modulus (N/mm$^2$)
ρ: filament density (g/cm$^3$)
$T_{ri}$: initial tensile resistance (N/tex)

[Stretch Modulus (%) of Filament]

In accordance with JIS L1013 (2010), and by using a constant rate extension type tensile tester (Autograph AG-500C, manufactured by Shimadzu Corporation), the filament was stretched to 3% or 50% elongation under conditions such that the gripping chuck interval is 100 mm and the speed is 100 mm/minute. Immediately after the elongation, the load was removed at the same speed, and the filament was held for 2 minutes and then stretched again to 3% or 50% elongation at the same speed. The residual elongation was measured from the stress-elongation curve and the stretch modulus was determined by the following equation.

$E = (L_0 - L)/L_0 \times 100$

E: stretch modulus (%)
$L_0$: length at 3% or 50% elongation (mm)
L: residual elongation (mm)

[Moisture Percentage (%)]

Moisture was measured in accordance with JIS L1013 (2010) either at a temperature of 20° C. under a relative humidity of 65%, or at a temperature of 20° C. under a relative humidity of 95%.

[Filament Diameter (m)]

The measurement was carried out using a dial gauge in accordance with JIS B7503 (2011).

Synthesis Example 1

Synthesis of 4-methyl-1-pentene/α-olefin copolymer (A-1)

300 ml of n-hexane (dried on activated alumina in a dry nitrogen atmosphere) and 450 ml of 4-methyl-1-pentene were charged at 23° C. into a sufficiently nitrogen purged 1.5 L autoclave made of SUS having a stirring blade. 0.75 ml of 1.0 mmol/ml toluene solution of triisobutylaluminum (TIBAL) was charged to this autoclave, and the stirrer was turned on.

Next, the autoclave was heated until the internal temperature reached 60° C. and pressurized with propylene so that the total pressure (gauge pressure) became 0.40 MPa.

Subsequently, 0.34 ml of a toluene solution containing 1 mmol of methylaluminoxane in terms of Al and 0.01 mmol of diphenylmethylene (1-ethyl-3-t-butylcyclopentadienyl) (2,7-di-t-butyl-fluorenyDzirconium dichloride, which had been prepared in advance, was injected into the autoclave with nitrogen to initiate a polymerization reaction. During the polymerization reaction, the temperature was adjusted so that the internal temperature of the autoclave was 60° C.

Sixty minutes after the initiation of the polymerization, 5 ml of methanol was injected into the autoclave with nitrogen to terminate the polymerization reaction, and then the inside of the autoclave was depressurized to an atmospheric pressure. After depressurization, acetone was added to the resultant reaction solution while stirring to obtain a polymerization reaction product containing a solvent.

Subsequently, the resulting polymerization reaction product containing a solvent was dried at 100° C. for 12 hours under reduced pressure, thereby obtaining 36.9 g of a copolymer (A-1) in a powder form. The measurement results of various physical properties of the obtained copolymer (A-1) are shown in Table 1.

The content of 4-methyl-1-pentene in the copolymer (A-1) was 72.5 mol % and the content of propylene in the copolymer (A-1) was 27.5 mol %. Further, the copolymer (A-1) had a density of 839 kg/m$^3$. The copolymer (A-1) had an intrinsic viscosity [η] of 1.5 dl/g, a weight-average molecular weight (Mw) of 337,000, a molecular weight distribution (Mw/Mn) of 2.1, and a melt flow rate (MFR) of 11 g/10 min. The melting point (Tm) of the copolymer (A-1) was not observed. The copolymer (A-1) had a tan δ peak temperature of 31° C. and a tan δ peak value of 2.8.

TABLE 1

|  |  |  | 4-Methyl-1-pentene copolymer (A) (A-1) |
|---|---|---|---|
| Composition | 4-Methyl-1-pentene | mol % | 72.5 |
|  | Type of α-olefin | — | Propylene |
|  | Content of α-olefin | mol % | 27.5 |
|  | Density | Kg/m$^3$ | 839 |
| Molecular weight | [η] | dL/g | 1.5 |
|  | Mw/Mn |  | 2.1 |
|  | MFR | g/10 min | 11 |
| Heat resistance | Melting point (Tm) | ° C. | Not observed |
| Stress absorptivity | tanδ Peak temperature | ° C. | 31 |
|  | tanδ Peak value |  | 2.8 |

Example 1

A multilayered sheet composed of a core layer consisting only of 100 parts by mass of the 4-methyl-1-pentene/α-olefin copolymer (A-1), and a surface layer consisting of 100 parts by mass of the olefin-based thermoplastic elastomer (C-1) (trade name TAFMER (registered trademark) PN-2060, manufactured by Mitsui Chemicals, Inc., melting point: 162° C., MFR: 6 g/10 min, gel content=0%) was molded by coextrusion using a 20 mmφ single screw extruder (single shaft molding machine for two-type, three-layer sheet, manufactured by TECHNOVEL CORPORATION) equipped with a T die having a lip width of 200 mm, thereby obtaining a sheet of Example 1. The sheet had a layer constitution of two types and three layers which is composed of a surface layer of 100 μm/a core layer of 100 μm/a surface layer of 100 μm. The results of evaluation of the physical properties of the obtained sheet are shown in Table 2.

Example 2

A multilayered sheet composed of a core layer consisting of 70 parts by mass of the 4-methyl-1-pentene/α-olefin copolymer (A-1) and 30 parts by mass of the olefin-based thermoplastic elastomer (B-3) (trade name MILASTOMER (registered trademark) 5030NS, manufactured by Mitsui Chemicals, Inc.), and a surface layer consisting of 100 parts by mass of the olefin-based thermoplastic elastomer (C-1) (trade name TAFMER (registered trademark) PN-2060, manufactured by Mitsui Chemicals, Inc., melting point: 162° C., MFR: 6 g/10 min, gel content=0%) was molded by coextrusion using a 20 mmφ single screw extruder (single shaft sheet molding machine for two-type, three-layer sheet, manufactured by TECHNOVEL CORPORATION) equipped with a T die having a lip width of 200 mm, thereby obtaining a sheet of Example 2. The sheet had a layer constitution of two types and three layers which is composed of a surface layer of 100 μm/a core layer of 100 μm/a surface layer of 100 μm. The results of evaluation of the physical properties of the obtained sheet are shown in Table 2.

Example 3

A multilayered sheet composed of a core layer consisting of 70 parts by mass of the 4-methyl-1-pentene/α-olefin copolymer (A-1) and 30 parts by mass of the olefin-based thermoplastic elastomer (B-3) (trade name: MILASTOMER (registered trademark) 5030NS, manufactured by Mitsui Chemicals, Inc.), and a surface layer consisting of 100 parts by mass of the olefin-based thermoplastic elastomer (C-2) (trade name MILASTOMER (registered trademark) 5030 NS, manufactured by Mitsui Chemicals, Inc., melting point: 162° C., MFR: 20 g/10 min, gel content=86%) was molded by coextrusion using a 20 mmφ single screw extruder (single shaft molding machine for two-type, three-layer sheet, manufactured by TECHNOVEL CORPORATION) equipped with a T die having a lip width of 200 mm, thereby obtaining a sheet of Example 3. The sheet had a layer constitution of two types and three layers which is composed of a surface layer of 100 μm/a core layer of 200 μm/a surface layer of 100 μm. The results of evaluation of physical properties of the obtained sheet are shown in Table 2.

Example 4

A multilayered sheet composed of a core layer consisting of 50 parts by mass of the 4-methyl-1-pentene/α-olefin copolymer (A-1) and 50 parts by mass of the olefin-based thermoplastic elastomer (B-3) (trade name MILASTOMER (registered trademark) 5030NS, manufactured by Mitsui Chemicals, Inc.), and a surface layer consisting of 100 parts by mass of the olefin-based thermoplastic elastomer (C-3) (trade name FULXUS FX J-170, manufactured by Nishida Giken Co., Ltd., melting point: 162° C., MFR: 20 g/10 min, gel content=42%) was molded by coextrusion using a 20 mmφ single screw extruder (single shaft molding machine for two-type, three-layer sheet, manufactured by TECHNOVEL CORPORATION) equipped with a T die having a lip width of 200 mm, thereby obtaining a sheet of Example 4. The sheet had a layer constitution of two types and three layers which is composed of a surface layer of 100 μm/a core layer of 100 μm/a surface layer of 100 μm. The results of evaluation of physical properties of the obtained sheet are shown in Table 2.

Comparative Example 1

A multilayered sheet composed of a core layer consisting of only 100 parts by mass of the 4-methyl-1-pentene/α-olefin copolymer (A-1) and a surface layer consisting of only 100 parts by mass of the olefin-based thermoplastic resin (trade name EVOLUE (registered trademark) SP2540, manufactured by Prime Polymer Co., Ltd., abbreviated as SP2540 in the table, melting point: 118° C., MFR: 3.8 g/10 min, gel content=0%) was molded by coextrusion using a 20 mmφ single screw extruder (single shaft molding machine for two-type, three-layer sheet, manufactured by TECHNOVEL CORPORATION) equipped with a T die having a lip width of 200 mm, thereby obtaining a sheet of Comparative Example 1. The sheet had a layer constitution of two types and three layers which is composed of a surface layer of 100 μm/a core layer of 100 μm/a surface layer of 100 μm. The results of evaluation of physical properties of the obtained sheet are shown in Table 2.

TABLE 2

| | | | Unit | Example 1 | Example 2 | Example 3 | Example 4 | Comparative Example 1 |
|---|---|---|---|---|---|---|---|---|
| Composition of materials | Core layer (Y) | (A-1) | Parts by mass | 100 | 70 | 70 | 50 | 100 |
| | | (B-3) | | | 30 | 30 | 50 | |
| | Surface layer (Z) | (C-1) | Parts by mass | 100 | 100 | | | |
| | | (C-2) | | | | 100 | | |
| | | (C-3) | | | | | 100 | |
| | | SP2540 | | | | | | 100 |
| | | Core layer/surface layer ratio | %/% | 33/67 | 33/67 | 33/67 | 33/67 | 33/67 |
| Physical properties of resin Composition (X) | Tm | | ° C. | Not observed | 160 | 160 | 160 | Not observed |
| | Stress absorptivity | tanδ Peak temperature | ° C. | 31 | 22.4 | 22.4 | 18.9 | 31 |
| | | tanδ Peak value | | 2.8 | 1.66 | 1.66 | 1.12 | 2.8 |
| Physical properties of sheet | Tensile properties | Elongation at break (EL) | % | 330 | 415 | 450 | 560 | 475 |
| | | Rupture strength (TS) | Mpa | 72 | 15 | 14 | 16 | 20 |
| | | Modulus of elasticity (YM) | Mpa | 221 | 50 | 42 | 65 | 285 |
| | Stress relaxation rate | 100% Elongation | % | 68 | 70 | 69 | 61 | Not determined |
| | | 300% Elongation | % | 65 | 71 | 62 | 56 | Not determined |
| | Stress permanent set at 150% elongation | 1 min after elongation ($PS_{1M}$) | % | 42 | 25.6 | 18.7 | 29.2 | 89.1 |
| | | 10 min after elongation ($PS_{10M}$) | % | 12.9 | 13.5 | 14.5 | 24.5 | 88.3 |
| | | $PS_{1M}/PS_{10M}$ | % | 3.3 | 1.9 | 1.29 | 1.19 | 1.0 |

From the results above, the sheets described in the Examples are characterized by high stress relaxation rates even after 100% elongation and 300% elongation, and high stretch ratio of tensile permanent set. On the other hand, in Comparative Example 1, the stress relaxation rate is low and the tensile permanent set after 150% elongation remains high after 1 minute and even after 10 minutes, and the stretch ratio is low. These results show that even when this stretched sheet is released, the sheet suffers plastic deformation and does not return to its original form.

Example 5

Filament spinning was carried out using a spinning nozzle equipped with a spinneret which has 18 holes with 1.4 mmφ diameter and is capable of forming a core layer/surface layer core-sheath structure, and using a spinning apparatus (manufactured by Fujibo Ehime Co., Ltd.) having a plurality of single screw extruders each having a bore diameter of 40 mmφ. The composition ratio of the multilayered filaments was controlled by adjusting the discharge amounts for the core layer/surface layer by means of the rotation speeds of two gear pumps. Hundred (100) parts by mass of the 4-methyl-1-pentene/α-olefin copolymer (A-1) melted at an appropriate cylinder temperature (230° C. to 290° C.) and 100 parts by mass of the polyolefin-based elastomer (C-1) (trade name TAFMER (registered trademark) PN-2060, manufactured by Mitsui Chemicals, Inc., melting point: 162° C., MFR: 6 g/10 minutes) were used as resins of the surface layer, and the strand discharged from the spinning nozzle was led to an air cooling type cooling tower to be cooled and solidified. The filaments stretched in accordance with the speed ratio of the heating roll was wound by a paper tube using a winder. The measurement results of physical properties of the obtained multilayered filaments are shown in Table 3.

Example 6

Using 100 parts by mass of the 4-methyl-1-pentene/α-olefin copolymer (A-1) as the resin composition of the core layer, and the polyamide-based elastomer (C-2) (trade name PEBAX (registered trademark) 4033, manufactured by Arkema Co., Ltd., melting point: 160° C., MFR: 7 g/10 min) as the resin of the surface layer, a filament was obtained by carrying out the spinning in the same manner as in Example 5, except that the elongation ratio and the core layer/surface layer ratio were adjusted as shown in Table 3. The evaluation results of physical properties of the obtained multilayered filament are shown in Table 3.

Example 7

Using a blend of 70 parts by mass of the 4-methyl-1-pentene/α-olefin copolymer (A-1) and 30 parts by mass of the thermoplastic elastomer (B-2) (trade name TUFTEC H1221, manufactured by Asahi Kasei Corporation, MFR: 4 g/10 minutes) as the resin composition of the core layer, and 100 parts by mass of the polyolefin-based elastomer (C-1) (trade name TAFMER (registered trademark) PN-2060, manufactured by Mitsui Chemicals, Inc., melting point: 162° C., MFR: 6 g/10 minutes) as the resin of the surface layer, a filament was obtained by carrying out the spinning in the same manner as in Example 3, except that the elongation ratio and the core layer/surface layer ratio were adjusted as shown in Table 3. The evaluation results of physical properties of the obtained multilayered filament are shown in Table 3.

TABLE 3

|  |  |  | Unit | Example 5 | Example 6 | Example 7 |
|---|---|---|---|---|---|---|
| Composition of material | Core layer (Y) | (A-1) | Parts by mass | 100 | 100 | 70 |
|  |  | (B-2) |  |  |  | 30 |
|  | Surface layer (Z) | (C-1) | Parts by mass | 100 |  | 100 |
|  |  | (C-2) |  |  | 100 |  |
|  | Core layer/surface layer ratio |  | %/% | 41/59 | 39/61 | 53/47 |
|  | Elongation ratio |  | % | 1.5 | 1.5 | 1.5 |
| Physical properties of resin composition (X) |  | MFR | g/10 min | 11 | 11 | 7.8 |
|  |  | Tm | ° C. | Not observed | 160 | Not observed |
|  | Stress absorptivity | tanδ Peak temperature | ° C. | 30 | 30 | 32 |
|  |  | tanδ Peak value |  | 2.8 | 2.8 | 2.1 |
| Physical properties of fiber | Apparent fineness |  | dtex | 274 | 416 | 325 |
|  | Tensile strength | 20° C., 65% RH | cN/dtex | 1.2 | 0.6 | 0.4 |
|  |  | 20° C., 95% RH | cN/dtex | 1.2 | 0.6 | 0.5 |
|  |  | Dry and Wet strength ratio | % | 1.0 | 1.0 | 1.0 |
|  | Elongation at break | 20° C., 65% RH | % | 73 | 88 | 64 |
|  |  | 20° C., 95% RH | % | 57 | 84 | 50 |
|  | Initial tensile resistance | 20° C., 65% RH | cN/dtex | 0.28 | 0.09 | 0.88 |
|  | Specific gravity |  |  | 0.87 | 0.92 | 0.88 |
|  | Apparent Young's modulus |  | N/mm² | 248 | 83 | 58 |
|  | Stretch modulus | 3% elongation | % | 94 | 94 | 98 |
|  |  | 50% elongation | % | 78 | 76 | 73 |
|  |  | Difference | % | 17 | 19 | 26 |
|  | Moisture percentage | 20° C., 65% RH | % | 0 | 0 | 0 |
|  | Tensile stress relaxation rate | at 10% elongation | % | 75 | 63 | 81 |

Similarly to the results of Examples 1 to 4, when the filaments of Examples 5 to 7 were stretched to 150% elongation at a tension rate of 200 mm/min, the tensile permanent set ($PS_{10M}$) obtained 10 minutes after elongation was in the range of 1% to 50%, and the ratio $PS_{1M}/PS_{10M}$ of tensile permanent set ($PS_{10M}$) obtained after 10 minutes to tensile permanent set ($PS_{1M}$) obtained after 1 minute was 1.7 or more.

As shown in Table 3, the filaments made of the stretchable structure of the present invention have low water absorption and low specific gravity and exhibits high tensile elongation rate and high tensile stress relaxation rate. Such excellent properties cannot be achieved at the same time by simply softening the raw material resin.

This application is an application claiming priority based on Japanese Patent Application No. 2016-061632 filed on Mar. 25, 2016, and the contents described in the claims, description and drawings of the above-mentioned application are incorporated into the present application.

The invention claimed is:

1. A stretchable structure having the following characteristics:
    a tensile permanent set ($PS_{10M}$) of 1% or more and 50% or less, wherein the tensile permanent set ($PS_{10M}$) is a value obtained 10 minutes after 150% elongation at a tension rate of 200 mm/minute in accordance with JIS K7127, and
    a ratio $PS_{1M}/PS_{10M}$ of 1.10 or more, wherein the $PS_{10M}$ is the tensile permanent set obtained 10 minutes after the elongation and the $PS_{1M}$ is the tensile permanent set obtained 1 minute after the elongation,
    wherein the stretchable structure comprises a surface layer (Z) including a thermoplastic elastomer (C) laminated on a surface of a core layer (Y) including a resin composition (X) which contains a 4-methyl-1-pentene/α-olefin copolymer (A) satisfying the following requirement (a):
    Requirement (a): the copolymer (A) contains 50 to 90 mol % of a structural unit (i) derived from 4-methyl-1-pentene and 10 to 50 mol % of a structural unit (ii) derived from an α-olefin (excluding 4-methyl-1-pentene), a total of the structural unit (i) and the structural unit (ii) being 100 mol %, and
    wherein the stretchable structure has one of:
    a multilayer sheet structure having two types and three layers composition which is composed of the surface layer (Z), the core layer (Y) and the surface layer (Z) laminated in this order, and
    a multilayered filament structure having a core-sheath structure formed by the core layer (Y) as a core and the surface layer (Z) as a sheath.

2. The stretchable structure according to claim 1, wherein the thermoplastic elastomer (C) is at least one member selected from a polyolefin-based elastomer (B-1), a polystyrene-based elastomer (B-2), and a polyamide-based elastomer (B-4).

3. The stretchable structure according to claim 2, wherein the polyolefin-based elastomer (B-1) is a dynamically cross-linked product having a gel content of 0% by weight or more and 90% by weight or less.

4. The stretchable structure according to claim 2, wherein the polyolefin-based elastomer (B-1) is a dynamically cross-linked product having a gel content of 20% by weight or more and 90% by weight or less.

5. The stretchable structure according to claim 2, wherein the polyolefin-based elastomer (B-1) is a dynamically cross-linked product of a crystalline polyolefin resin (C-1) and an olefin-based rubber (C-2).

6. The stretchable structure according to claim 1, wherein the 4-methyl-1-pentene/α-olefin copolymer (A) is a copolymer of a structural unit (i) derived from 4-methyl-1-pentene and a structural unit (ii) derived from propylene.

7. The stretchable structure according to claim 1, which has the multilayered sheet structure.

8. A multilayered stretchable sheet comprising:
    at least one layer of the stretchable structure according to claim 7.

9. The stretchable structure according to claim 1, which has the multilayered filament structure.

10. The stretchable structure according to claim 9, wherein the difference between 3% stretch modulus value and 50% stretch modulus value, both measured in accordance with JIS L1013, is 50% or less.

11. A spun yarn comprising:
    the stretchable structure having a multilayered filament structure according to claim 9.

12. A fiber structure comprising:
    the spun yarn according to claim 11.

* * * * *